United States Patent
Hannah et al.

(10) Patent No.: US 9,403,548 B2
(45) Date of Patent: Aug. 2, 2016

(54) MONITORING USAGE OR STATUS OF CART RETRIEVERS

(71) Applicant: Gatekeeper Systems, Inc., Irvine, CA (US)

(72) Inventors: Stephen E. Hannah, Placentia, CA (US); Jesse M. James, Ladera Ranch, CA (US); Chandrashekhar Ekbote, Irvine, CA (US)

(73) Assignee: Gatekeeper Systems, Inc., Irvine, CA (US)

( * ) Notice: Subject to any disclaimer, the term of this patent is extended or adjusted under 35 U.S.C. 154(b) by 0 days.

(21) Appl. No.: 14/808,971

(22) Filed: Jul. 24, 2015

(65) Prior Publication Data

US 2016/0023675 A1    Jan. 28, 2016

Related U.S. Application Data

(60) Provisional application No. 62/029,347, filed on Jul. 25, 2014.

(51) Int. Cl.
*B62B 5/00* (2006.01)
*B62B 3/14* (2006.01)
(Continued)

(52) U.S. Cl.
CPC ............. *B62B 5/0076* (2013.01); *B62B 3/14* (2013.01); *B62B 5/0033* (2013.01); *G05D 1/0016* (2013.01); *G05D 1/0022* (2013.01); *G05D 1/028* (2013.01); *G07C 5/085* (2013.01)

(58) Field of Classification Search
CPC ...... B62B 5/0076; B62B 5/0033; B62B 3/14; G05D 1/028; G05D 1/0022; G05D 1/0016; G07C 5/085

USPC ............................................................ 701/2
See application file for complete search history.

(56) References Cited

U.S. PATENT DOCUMENTS

| 5,315,290 A | 5/1994 | Moreno et al. |
| 5,439,069 A | 8/1995 | Beeler |

(Continued)

FOREIGN PATENT DOCUMENTS

WO    WO 2016/015000 A1    1/2016

OTHER PUBLICATIONS

Invitation to Pay Additional Fees in corresponding International Patent Application No. PCT/US2015/042096, mailed Sep. 15, 2015, in 2 pages.

(Continued)

*Primary Examiner* — Mussa A Shaawat
*Assistant Examiner* — Abdhesh Jha
(74) *Attorney, Agent, or Firm* — Knobbe, Martens, Olson & Bear LLP

(57) ABSTRACT

Examples of systems and methods for controlling or monitoring a fleet of human-propelled, wheeled carts and cart retrievers are described. The carts can be shopping carts at a retail facility, and the cart retrievers can be used to collect and return the shopping carts from a parking lot near the facility to a cart collection area. The carts or cart retrievers can monitor various status or usage parameters (such as retriever battery charge, cart collection trip speed, cart collection path or duration, etc.) and transmit the parameters to a central control unit. The central control unit can analyze and process the status or usage parameters. The system can provide a user interface for access to the status or usage parameters of the cart and cart retriever fleet.

21 Claims, 10 Drawing Sheets

(51) Int. Cl.
   *G05D 1/00* (2006.01)
   *G05D 1/02* (2006.01)
   *G07C 5/08* (2006.01)

(56) References Cited

U.S. PATENT DOCUMENTS

| | | | |
|---|---|---|---|
| 5,512,879 A | 4/1996 | Stokes | |
| 5,557,513 A | 9/1996 | Frey et al. | |
| 5,598,144 A | 1/1997 | Lace | |
| 5,610,586 A | 3/1997 | Zeytoonjian et al. | |
| 5,719,555 A | 2/1998 | Zeytoonjian et al. | |
| 5,831,530 A | 11/1998 | Lace et al. | |
| 5,877,962 A | 3/1999 | Radcliffe | |
| 5,934,694 A * | 8/1999 | Schugt | B60L 11/1816 180/167 |
| 6,024,655 A | 2/2000 | Coffee | |
| 6,070,679 A | 6/2000 | Berg et al. | |
| 6,125,972 A | 10/2000 | French et al. | |
| 6,127,927 A | 10/2000 | Durban et al. | |
| 6,220,379 B1 | 4/2001 | Schugt et al. | |
| 6,244,366 B1 | 6/2001 | Otterson et al. | |
| 6,362,728 B1 | 3/2002 | Lace et al. | |
| 6,446,005 B1 | 9/2002 | Bingeman et al. | |
| 6,529,164 B1 | 3/2003 | Carter | |
| 6,700,493 B1 | 3/2004 | Robinson | |
| 6,867,694 B2 | 3/2005 | Wieth et al. | |
| 6,880,652 B2 | 4/2005 | Holtan et al. | |
| 6,894,614 B2 | 5/2005 | Eckstein et al. | |
| 6,911,908 B1 | 6/2005 | Beart | |
| 6,928,343 B2 | 8/2005 | Cato | |
| 6,945,366 B2 | 9/2005 | Taba | |
| 6,971,464 B2 | 12/2005 | Marino et al. | |
| 7,034,695 B2 | 4/2006 | Troxler | |
| 7,053,823 B2 | 5/2006 | Cervinka et al. | |
| 7,084,765 B2 | 8/2006 | Clapper | |
| 7,183,910 B2 | 2/2007 | Alvarez et al. | |
| 7,199,709 B2 | 4/2007 | Parsons | |
| 7,218,225 B2 | 5/2007 | Wieth et al. | |
| 7,277,010 B2 | 10/2007 | Joao | |
| 7,389,836 B2 | 6/2008 | Johnson et al. | |
| 7,395,886 B2 | 7/2008 | Berg et al. | |
| 7,397,373 B2 | 7/2008 | Hunt | |
| 7,420,461 B2 | 9/2008 | Nebolon et al. | |
| 7,474,218 B2 | 1/2009 | Johnson et al. | |
| 7,493,979 B2 | 2/2009 | Johnson et al. | |
| 7,496,532 B2 | 2/2009 | Johnson et al. | |
| 7,533,742 B2 | 5/2009 | Johnson et al. | |
| 7,549,651 B2 | 6/2009 | Holtan et al. | |
| 7,571,914 B2 | 8/2009 | Holtan et al. | |
| 7,658,247 B2 | 2/2010 | Carter | |
| 7,740,114 B2 | 6/2010 | Means et al. | |
| 7,810,612 B2 | 10/2010 | Gray | |
| 7,944,368 B2 | 5/2011 | Carter et al. | |
| 8,046,160 B2 | 10/2011 | Carter et al. | |
| 8,360,459 B2 | 1/2013 | Holtan et al. | |
| 8,406,993 B2 | 3/2013 | Hannah et al. | |
| 8,417,445 B2 | 4/2013 | Hannah et al. | |
| 8,433,507 B2 | 4/2013 | Hannah et al. | |
| 8,463,540 B2 | 6/2013 | Hannah et al. | |
| 8,473,192 B2 | 6/2013 | Hannah et al. | |
| 8,478,471 B2 | 7/2013 | Hannah et al. | |
| 8,558,698 B1 | 10/2013 | Hannah et al. | |
| 8,570,171 B2 | 10/2013 | Hannah et al. | |
| 8,571,778 B2 | 10/2013 | Hannah et al. | |
| 8,578,984 B2 | 11/2013 | Hannah et al. | |
| 8,606,501 B2 | 12/2013 | Hannah et al. | |
| 8,674,845 B2 | 3/2014 | Carter et al. | |
| 8,684,373 B2 | 4/2014 | Holtan | |
| 8,700,230 B1 | 4/2014 | Hannah et al. | |
| 8,718,923 B2 | 5/2014 | Hannah et al. | |
| 8,751,148 B2 | 6/2014 | Carter et al. | |
| 8,820,447 B2 | 9/2014 | Carter et al. | |
| 8,894,086 B2 | 11/2014 | Ekbote | |
| 8,973,716 B2 | 3/2015 | McKay et al. | |
| 8,997,905 B2 | 4/2015 | Johnson et al. | |
| 9,010,771 B2 | 4/2015 | Holtan et al. | |
| 9,091,551 B2 | 7/2015 | Hannah et al. | |
| 9,205,702 B2 | 12/2015 | Hannah et al. | |
| 2001/0017588 A1 | 8/2001 | Symonds et al. | |
| 2001/0028301 A1 | 10/2001 | Geiger et al. | |
| 2002/0016674 A1 | 2/2002 | Rudow et al. | |
| 2002/0161651 A1 | 10/2002 | Godsey et al. | |
| 2003/0043073 A1 | 3/2003 | Gray et al. | |
| 2003/0206102 A1 | 11/2003 | Joao | |
| 2004/0130457 A1 | 7/2004 | Ueda | |
| 2004/0215532 A1 | 10/2004 | Boman et al. | |
| 2004/0243262 A1 | 12/2004 | Hofmann | |
| 2005/0021710 A1 | 1/2005 | Johnson et al. | |
| 2005/0049914 A1 | 3/2005 | Parrish | |
| 2005/0075785 A1 * | 4/2005 | Gray | A01B 69/008 701/410 |
| 2005/0098364 A1 * | 5/2005 | Johnson | B60L 11/18 180/65.1 |
| 2006/0136303 A1 | 6/2006 | Bell et al. | |
| 2006/0244588 A1 * | 11/2006 | Hannah | B60T 7/18 340/539.13 |
| 2006/0279421 A1 | 12/2006 | French et al. | |
| 2007/0096899 A1 | 5/2007 | Johnson | |
| 2007/0289787 A1 | 12/2007 | Wiff et al. | |
| 2008/0225879 A1 | 9/2008 | Powell | |
| 2008/0309389 A1 | 12/2008 | French et al. | |
| 2008/0315540 A1 | 12/2008 | Hannah et al. | |
| 2009/0037040 A1 * | 2/2009 | Salmon | B63B 17/00 701/21 |
| 2009/0063176 A1 | 3/2009 | French et al. | |
| 2009/0076895 A1 | 3/2009 | French et al. | |
| 2009/0179760 A1 | 7/2009 | Nebolon et al. | |
| 2010/0078905 A1 | 4/2010 | Holtan | |
| 2011/0087497 A1 * | 4/2011 | Avallone | G06Q 30/02 705/1.1 |
| 2012/0320199 A1 | 12/2012 | Kundu et al. | |
| 2013/0257000 A1 | 10/2013 | Hannah et al. | |
| 2013/0264786 A1 | 10/2013 | Hannah et al. | |
| 2014/0062062 A1 | 3/2014 | Ekbote | |
| 2014/0070004 A1 | 3/2014 | French et al. | |
| 2014/0125019 A1 | 5/2014 | Hannah et al. | |
| 2014/0250627 A1 | 9/2014 | McKay | |
| 2014/0350851 A1 | 11/2014 | Carter et al. | |
| 2015/0197266 A1 | 7/2015 | Carter et al. | |
| 2015/0239290 A1 | 8/2015 | McKay et al. | |
| 2015/0325093 A1 | 11/2015 | Hannah et al. | |
| 2015/0344055 A1 | 12/2015 | Hannah et al. | |

OTHER PUBLICATIONS

Dane Technologies, Inc., "QuicKART 2000 Owner's Manual, Operating Instructions, Training Manual," Part No. 970-005, Mar. 10, 2006.

Gatekeeper Systems, Inc., "CartManager XD Owner/Operator Training and Troubleshooting Guide," Version 1.0, Jul. 2007.

International Search Report and Written Opinion in corresponding International Patent Application No. PCT/US2015/042096, mailed Dec. 11, 2015, in 13 pages.

\* cited by examiner

MONITORING USAGE OR STATUS OF CART RETRIEVERS

CROSS REFERENCE TO RELATED APPLICATIONS

This application claims the benefit of priority under 35 U.S.C. §119(e) to U.S. Provisional Patent Application No. 62/029,347 filed on Jul. 25, 2014 and titled "CART MANAGER CONTROLLER AND BATTERY MONITOR," which is hereby incorporated by reference herein in its entirety.

BACKGROUND

1. Field

The disclosure generally relates to systems and methods for controlling or monitoring retrievers for human-propelled, wheeled carts including, but not limited to shopping carts.

2. Description of Related Art

Many establishments use or provide human-propelled, wheeled carts. For example, retail stores often provide shopping carts to customers for their shopping convenience. Customers typically leave shopping carts in the parking lot of the store after the customers have finished shopping. Cart retrieval units (sometimes also referred to as cart retrievers) are motorized vehicles adapted to collect one or more carts and return them to a collection or storage area.

SUMMARY

There remains a need to improve systems and methods for controlling or monitoring material handling vehicles, including retrievers for human-propelled carts.

Examples of systems and methods for controlling or monitoring a fleet of human-propelled, wheeled carts and cart retrievers are described. In some implementations, the carts can be shopping carts at a retail facility, and the cart retrievers can be used to collect and return the shopping carts from a parking lot near the facility to a cart collection area. The carts or cart retrievers can monitor various status or usage parameters (such as retriever battery charge, cart collection trip speed, path, or duration, etc.) and transmit the status or usage parameters to a central control unit. The central control unit can analyze and process the status or usage parameters. The system can provide a user interface for access to the status or usage parameters of the cart and cart retriever fleet.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

Throughout the drawings, reference numbers may be reused to indicate correspondence between referenced elements. The drawings are provided to illustrate example embodiments described herein and are not intended to limit the scope of the disclosure.

DETAILED DESCRIPTION

Overview

Some examples refer to the retriever for human-propelled, wheeled carts under the name CartManager ("CM") (which is an example of a shopping cart retriever and is available from Gatekeeper Systems, Inc. of Irvine, Calif.); however these examples are for the purpose of illustration and these examples do not limit the disclosure.

Further, although certain examples are described with reference to shopping carts and shopping cart retrievers in a retail store environment (e.g., a supermarket), this is for the purpose of illustration and these examples do not limit the disclosure. For example, in other implementations the cart can be any type of human-propelled (e.g., non-motorized) movable object or wheeled vehicle including a warehouse cart, a luggage or baggage cart, a hospital cart, a wheelchair, a hospital bed, and so forth. The cart retriever can be any type of motorized retrieval unit for collecting movable objects or wheeled vehicles. Additionally, the control, status, or usage monitoring functionality described herein can be used with any type of material handling vehicle or equipment.

Figure 1:
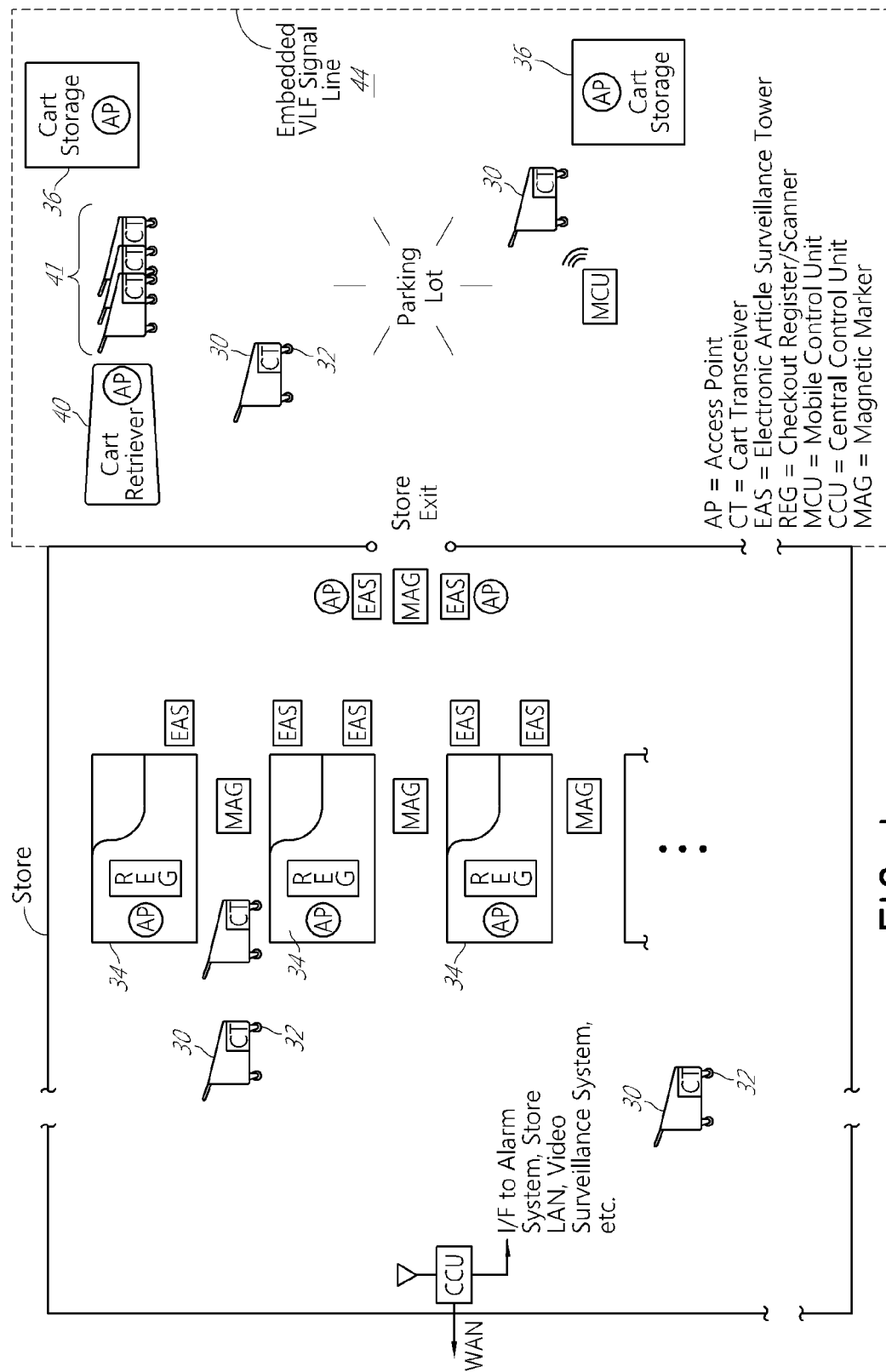
FIG. 1 shows various types of components of an example system that may be deployed in and around a store for purposes of tracking shopping carts or controlling or monitoring cart retrievers.

FIG. 1 shows various types of components of an example system that may be deployed in and around a store for purposes of tracking shopping carts or monitoring usage or status of cart retrievers. In the embodiment of FIG. 1, the vehicle tracking system is shown deployed in a store for purposes of tracking and controlling the movement of shopping carts 30. However, the inventive components and methods of the vehicle tracking system may be used for other applications, such as tracking luggage carts in an airport, stretchers in a hospital, or carts in a warehouse. As further described below, the vehicle tracking system can be deployed for monitoring usage or status of cart retrievers that are used to collect carts.

The system includes a set of cart transceivers (CTs) that communicate bi-directionally with a set of wireless access points (APs) to create two-way communications links with the shopping carts 30. In one embodiment, each cart transceiver (CT) is fully contained within one of the standard-size (5-inch diameter) wheels 32 (typically a front wheel) of a respective shopping cart 30, together with a braking unit that can be actuated by the cart transceiver to lock the wheel. One example of a braking unit that may be used for this purpose is described in U.S. Pat. No. 6,362,728, which is hereby incorporated by reference herein in its entirety for all it discloses so as to form a part of this specification. (For purposes of this detailed description, the term "cart transceiver" refers collectively to the cart's RF transceiver and the associated sensor circuitry). Alternatively, a progressive or partial braking unit may be used that is additionally capable of inhibiting the wheel's rotation without placing the wheel in a locked state.

Some of the circuitry of the cart transceivers (CTs) may alternatively be provided elsewhere on the shopping carts 30. For example, as described below, some of the transceiver circuitry (or other circuitry) may alternatively be included in a display unit that attaches to the shopping cart's handle or on or within the shopping cart's handle or frame. As another example, some or all of the circuitry, including sensor circuitry, could be housed in the wheel assembly (e.g., in the wheel's caster or fork) without being included in the wheel itself. Examples of a wheel and a display unit attached to a shopping cart's handle are described in U.S. Pat. No. 8,463,540, issued Jun. 11, 2013. U.S. Pat. No. 8,463,540 ('540 Patent) is hereby incorporated by reference herein in its entirety for all it discloses so as to form part of this specification.

The access points (APs) are generally responsible for communicating with the cart transceivers (CTs) for purposes of retrieving and generating cart status information, including information indicative or reflective of cart location. The types of cart status information that may be retrieved and monitored include, for example, whether the wheel 32 is in a locked versus unlocked state, whether the cart is moving; the wheel's average rotation speed (as may be sensed using a rotation sensor in the wheel 32); whether the cart has detected a particular type of location-dependent signal such as a very low frequency (VLF, typically from 3 kHz to 30 kHz) radio frequency (RF) signal, an electronic article surveillance (EAS) signal, an RF signal in the telecommunications band (e.g., S band (about 2 GHz to 4 GHz) or C band (about 4 GHz to 8 GHz), an RF signal in the Industrial, Scientific, and Medical (ISM) band (e.g., near 2.4 GHz or 5.8 GHz), or a magnetic signal; whether the wheel 32 is skidding; the CT's battery level and a general wheel "health"; and the number of lock/unlock cycles experienced by the cart since some reference time. (The term "wheel 32" is used herein to refer specifically to a wheel that includes electronics as described herein, as opposed to the other wheels of the shopping cart.) The access points (APs) are also capable of generating and/or relaying commands to the cart transceivers (CTs), including lock and unlock commands that are sent to specific shopping carts.

In the embodiment shown in FIG. 1, some or all of the access points (APs) communicate wirelessly with a central control unit (CCU), either directly or via intermediate access points. The central control unit may be implemented as a personal computer that includes a wireless transceiver card or which is wire-connected to an external transceiver unit. The CCU is generally responsible for collecting, storing and analyzing cart status information, including location information, gathered by the access points (APs). In addition to the data retrieved from the cart transceivers (CTs), the CCU may collect data generated by the access points, such as signal strength measurements of detected cart transmissions. Some or all of the collected data is preferably stored by the CCU together with associated event timestamps.

The CCU may analyze the collected data in real time for purposes of making decisions, such as whether to send a lock command to a particular cart 30 or whether to send an alert message to personnel. For example, when a cart is approaching or passing through the store exit, the CCU may analyze the cart's recent history (e.g., path and speed) to evaluate whether a customer is attempting to leave the store without paying. (The access points may additionally or alternatively be responsible for making such determinations.) Based on the outcome of this determination, the CCU may send a lock command to the cart (typically via an access point), or may refrain from issuing a command that authorizes the cart to exit. As another example, if the CCU detects a rapid increase in the number of active carts, the CCU may alert personnel (e.g., over a store LAN) regarding the possible need to open an additional checkout station.

The CCU may also run data mining and reporting software that analyzes the data collected over time for purposes of detecting meaningful traffic patterns and trends. For example, the CCU may generate reports showing how customers typically progress through the store, and how much time they spend in each aisle or other shopping area. This information may be used to, for example, adjust the store layout. The CCU may also generate reports showing the status or usage of cart retrievers, for example, the duration or paths of trips to collect carts, the number of carts collected, duration of battery charge or charging time, battery charge levels, and so forth (see, e.g., FIG. 7A).

The CCU may additionally or alternatively convey the data it collects over a cellular network or the Internet to a remote node that handles analysis and reporting tasks. For example, the CCU (and possibly one or more access points) may have an autonomous WAN link that uses a cellular data service such as GPRS to convey the collected data to a remote node for analysis and reporting. This feature can be used to monitor the system's health from a remote facility. The system may also be capable of being tested and configured via the WAN link from the remote facility.

As depicted in FIG. 1, the CCU may connect to various other types of systems that exist within the store. For example, the CCU may connect to a preexisting alarm system and/or video surveillance system, in which case the CCU may be configured to activate an audible alarm or a video camera upon detecting an unauthorized exit event. As another example, the CCU may connect to a pre-existing central store computer that maintains information regarding the states of the store's checkout registers; as described below, this information may be retrieved and used by the CCU to evaluate whether a customer has passed through an active checkout lane.

In some implementations of the system, the CCU may be omitted. In these implementations, the access points (APs) may implement all of the real time analysis functionality that might otherwise be handled by the CCU. For example, an access point mounted in the vicinity of the store exit may be capable of detecting that a customer is attempting to exit the store without paying, and deciding whether to send a lock command to the cart. An access point in a cart retriever may be capable of monitoring status or usage of the retriever and the carts being collected. To accommodate both centralized and distributed installations, each access point may be capable of operating both with and without a CCU. Implementations are also possible in which the access points are omitted (apart from APs in cart retrievers), such that the CCU communicates directly with the cart transceivers or APs in cart retrievers.

The cart transceivers (CTs), access points (APs), and central control unit (CCU) all operate as uniquely addressable nodes on a wireless tracking network. As shown in FIG. 1, another type of node that may be included on the network is a handheld mobile control unit (MCU). The mobile control unit is designed to enable store personnel to unlock individual carts via depression of a button, as is known in the art. The mobile control unit may also include functionality for retrieving and displaying various types of cart status information, for configuring the wheels/cart transceivers and updating their firmware, and for controlling a motorized cart retriever 40 (see discussion of cart retriever 40 below) also referred to as "CM." The MCU may communicate with the CCU, APs, or CTs.

The various types of nodes (e.g., cart transceivers, access points, central control unit, and mobile control unit) communicate with each other using a non-standard wireless communications protocol that enables the cart transceivers to operate at very low duty cycles, without the need to maintain synchronization with the access points when inactive. Consequently, the cart transceivers can operate for extended periods of time (e.g., approximately 3 years with an average of 0.7 lock/unlock events per day) using a relatively small battery, such as one CR123A ($LiMnO_2$) battery or two L91 ($LiFeS_2$) batteries mounted in the wheel 32. The details of the communication protocol can be similar to those described in the '540 Patent.

Each cart transceiver (CT) is preferably capable of measuring the received signal strength, in terms of an RSSI (received signal strength indication) value, of the transmissions it receives on the wireless tracking network. The system may use these RSSI measurements in various ways. For example, a cart transceiver may compare the RSSI value of an access point's transmission to a threshold value to determine whether to respond to the transmission. The cart transceiver may also report this RSSI value to the access point (together with the cart transceiver's unique ID) to enable the system to estimate the location of, or distance to, the shopping cart. As another example, the cart transceivers may be programmed to generate and report RSSI values of transmissions from other nearby cart transceivers; this information may in turn be used to estimate the number of carts that are queued at a checkout lane, in a cart storage structure, in a cart nest or train being retrieved with a mechanized cart retriever 40, or elsewhere. Examples of methods that may be used to estimate the number of queued or clustered carts in a particular area are described in the '540 Patent. For example, such methods may be used to estimate the number of carts being collected by a cart retriever.

Three checkout stations 34 are shown in FIG. 1, each of which includes a checkout register (REG), which typically includes a merchandise scanner. Each checkout station 34 in this particular example includes an access point (AP), which may be mounted to the preexisting pole (if present) that indicates the number of the checkout lane. Each such access point may include a connection or sensor that enables it to determine whether the respective checkout station is currently active. This information is useful for assessing whether a customer who passes through the checkout lane has paid. Several different methods that may be used to sense the active/inactive state of a checkout station are described below. Each access point that is positioned at a checkout station 34 may use a directional antenna to communicate with nearby shopping carts/cart transceivers, such as those that are queued in the corresponding checkout lane.

Access points may additionally or alternatively be mounted to various other fixed and/or mobile structures in the vicinity of the store. For example, as shown in FIG. 1, access points may be mounted to a shopping cart storage structure 36 (two shown) in the store parking lot. These parking-structure-mounted access points may be used to detect and report the number of carts stored in their respective areas, and may also be used to enable the in-store access points or CCU to communicate with carts that would otherwise be out of range.

As illustrated in FIG. 1, an access point (AP) may also be mounted on a power-assisted (mechanized) cart retriever or trolley 40, which may be either a cart pusher or cart puller. One example of such a retriever 40 is the CartManager product of Gatekeeper Systems, Inc. The retriever-mounted access point may serve various functions related to cart retrieval, including one or more of the following: (1) sending unlock commands to a nest 41 of carts 30 being retrieved, such that the wheels 32 of these carts are not damaged by being retrieved while in a locked state, (2) detecting whether the cart retriever 40 is being used to push or pull more than an authorized number (e.g., 15) carts at a time, and disabling the cart retriever 40, and/or reporting the event if such misuse is detected, (3) in embodiments in which the wheel 32 or wheel assembly supports partial braking, instructing the cart or carts at the front of the nest 41 (particularly in the case of a cart pusher) to apply weak braking so that the carts do not become un-nested, with the degree of braking applied optionally being dependent upon the detected slope of the ground; and (4) in embodiments in which the wheels 32 include vibration sensors for detecting wheel skid events, responding to skid-event messages from the carts being retrieved by disabling the cart retriever 40 and/or alerting an operator. It should be noted that in many cases the wheel skid events occur because a cart being retrieved is mis-nested such that the skidding wheel cannot swivel to point in the correct direction.

The cart retriever mounted access point may also monitor status of the retriever (e.g., battery charge, key switch on-time, driving time, etc.) as well as usage statistics of the retriever (e.g., trip duration, trip path, average speed, number of carts retrieved, etc.). In some implementations, the cart retriever access point can communicate with CTs in the carts (e.g., in a wheel, frame, or handlebar), with the CCU, and with the MCU used to remotely control the retriever 40. For example, in some cases the CT can determine location of the cart, e.g., by using GPS, AP zone entry/exit, or using a magnetic navigation system. The AP in the retriever can communicate with the CT to receive the location information from the CT. The AP in the retriever (or the CT) can determine whether the cart (or retriever) is following a preset path, e.g., established by the store for efficient or optimal cart collection by operators of the retriever. The AP in the retriever or the CT can communicate operator compliance information to the CCU (e.g., whether the operator followed the preset path, an extent of deviation from the preset path, etc.). The AP in the retriever or the CT can communicate operator compliance information to the MCU, which may display (e.g., on display device, see, FIG. 7B) a warning to the operator if the cart or cart retriever is straying too far from the preset path. In some cases, the cart retriever may apply a brake, cut power to the retriever motor, or sound a horn or light a light, if the operator is not in compliance. In some implementations, the path may include time milestones that the operator is to meet in order to efficiently collect carts. The CT or the retriever AP may monitor compliance by the operator with directing the cart along the path at the appropriate speed to meet the time milestones.

In one embodiment, the cart retriever 40 is a battery powered cart pusher that is adapted to be positioned at the rear of a cart stack to be retrieved. The operator manually steers the cart stack by holding the front cart with one hand while holding the MCU in the other hand. Via a set of buttons on the MCU (see, e.g., FIG. 7B), the operator can control the forward and backward direction and speed of the retriever 40. Various type of status information may be displayed to the operator on a display of the MCU, such as the estimated number of carts being retrieved (as determined using the cluster analysis methods described in the '540 Patent), the speed of the retriever, trip duration, etc. If the retriever-mounted access point detects a misuse condition (e.g., a skid event or too many carts being pushed), it may disable the retriever 40 in various ways, such as by "spoofing" a manual throttle interface, or if the retriever 40 contains a motor controller with a digital external control interface, by issuing a stop command via this interface.

The example store configuration in FIG. 1 is also shown as having a VLF signal line 44 embedded in the pavement along an outer perimeter of the parking lot. Such signal lines are commonly used in theft prevention systems to define the outer boundary of the area in which shopping carts are permitted. In such prior art systems, the wheel 32 of each shopping cart includes a VLF receiver that detects the VLF signal, and engages the brake, when the cart is pushed over the signal line 44. Although not shown in FIG. 1, a VLF line may also be provided at the store exit such that all carts that pass through the exit have to cross over this line, and/or at other locations of interest.

While the present system does not require the use of a VLF signal line 44, the system is preferably capable of using one or more VLF lines as a mechanism for monitoring cart location. Specifically, cart transceiver (CT) includes a VLF receiver in certain embodiments. The VLF receiver may be capable of detecting a code transmitted on a VLF line, so that different lines can be used to uniquely identify different areas or boundaries. When the VLF signal is detected, the cart transceiver may take various actions, depending on the circumstances. For example, the cart transceiver may attempt to report the VLF detection event on the wireless tracking network and then wait for a command indicating whether to engage the brake. If no command is received within a pre-programmed time period in this example (e.g., 2 seconds), the cart transceiver may automatically engage the brake. In other embodiments, the VLF signal is not used, and the system may operate wirelessly via the APs.

As will be apparent from the foregoing discussion, many of the components shown in FIG. 1 are optional components that may or may not be included in a given system installation. For instance, the magnetic markers, the EAS towers, and/or the VLF signal line can be omitted. In addition, either the access points or the CCU can be omitted. Further, the illustrated components may be arranged differently than illustrated. For instance, VLF signal lines could be provided in the checkout lanes and/or in the store exit/entrance (e.g., in place of the magnetic markers and EAS towers shown) to enable the carts to detect checkout events and exit/entrance events, respectively. Further, other types of signal transmitters and detectors/receivers could be used to monitor cart locations.

Cart Retriever

Figure 2A:
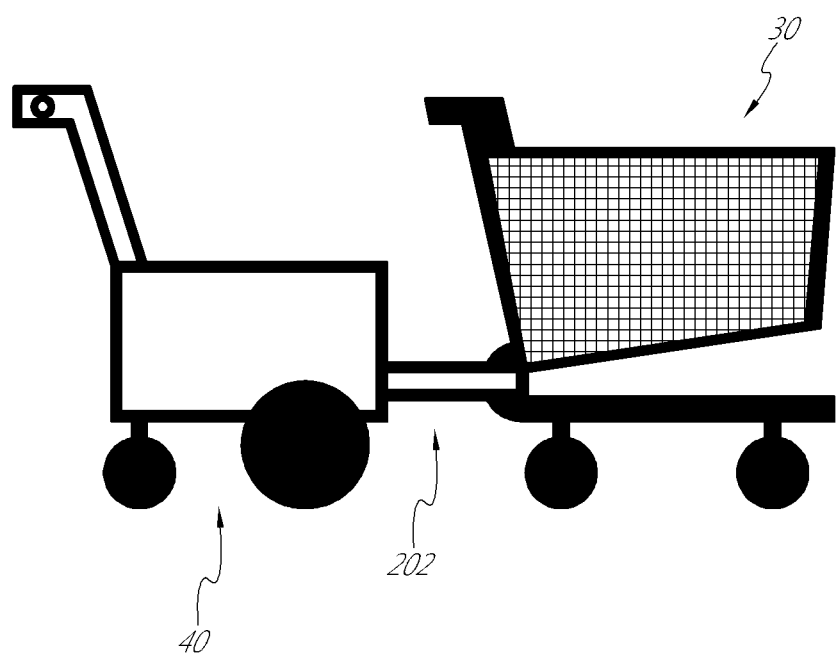
FIG. 2A shows a schematic illustration of a cart retriever connected with a shopping cart via a connection assembly.

FIG. 2A shows a schematic illustration of a cart retriever 40 connected with a shopping cart via a connection assembly 201. Some embodiments of the connection assembly 201 are configured to connect with a shopping cart and to mount to a cart retriever 40. Generally, the cart retriever 40 is a steerable self-propelled, motorized material handling vehicle that is configured to provide sufficient power to push (or pull) at least one nested chain of carts (sometimes referred to as a cart train). For example, the cart retriever 40 may be configured to push or pull at least: 10 carts, 20 carts, or 30 carts. In certain implementations, the cart retriever 40 is configured to push or pull at least: about 500 pounds, about 1,000 pounds, or about 1,500 pounds. The cart retriever 40 typically includes an electric motor that is powered by one or more rechargeable batteries (e.g., a number of 12 V automobile batteries). In some cases, the retriever 40 can include an engine that is powered by petroleum fuel or natural gas. The cart retriever 40 can include a drive train (not shown) that is powered by the electric motor and which causes wheels of the retriever to turn so as to provide traction to the retriever for forward or reverse movement.

In certain configurations, and as will be discussed in further detail below, a cart 30 (e.g., a wheeled retail shopping cart) can be connected to a front of the connection assembly 201. Additional carts can be nested with the first cart, thereby providing the ability for the retriever 40 to move, via the connection assembly 201, a train 41 of nested carts. In some embodiments, the connection assembly 201 is configured to connect with a rear portion of a frame of the cart, such as the rear legs of the cart, for example, by using spring-loaded hooks or latches. In other embodiments, the connection assembly 201 can include cups that hold the rear wheels of a cart. In various embodiments, the rear wheels of the cart remain in contact with the ground during connection with the connection assembly 201, which can facilitate engagement and provide enhanced durability of the connection assembly 201.

Figure 2B:
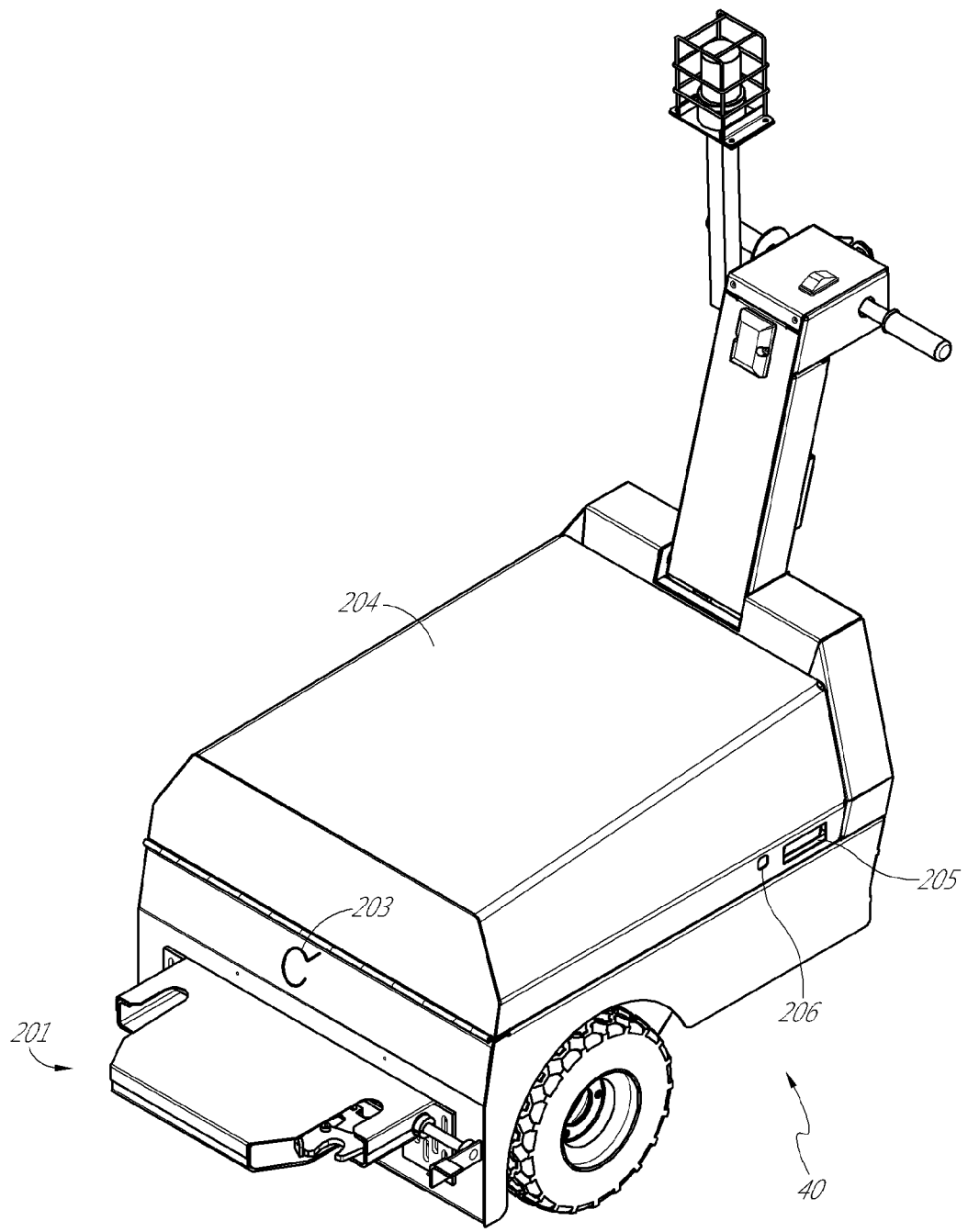
FIG. 2B shows a perspective view of an embodiment of a motorized cart retriever.

FIG. 2B shows a perspective view of an embodiment of a motorized cart retriever 40. In the embodiment of FIG. 2B, a cart retriever 40 has a connection assembly 201 that connects to two generally vertical portions of the cart, such as a generally vertical bar or strut. In some embodiments, the cart retriever 40 can have a connection assembly in the form of U-shaped cart cradles, with each cart cradle configured to hold a rear wheel of a cart that can be lifted up and then set down inside of the cart cradle. Some cart cradles are configured to hold the rear wheels off the ground by supporting the rear wheels from below, while other cart cradles are open at the bottom and keep the rear wheels on the ground.

The cart retriever 40 can have one or more cart hooks 203. The cart hook can be used to anchor an end of a rope that is used to help secure the nest 41 of carts 30 to the retriever 40. When the cart retriever is connected to a train 41 of carts 30, the rope can be looped around the train 41 of carts 30 and connected or hooked to one of the carts, to make sure that the carts do not break away from the train 41.

The cart retriever 40 can have a hood 204 that can be opened by lifting a handle 205. A hood lock 206 can be used to prevent unauthorized opening of the hood and can require a key, password, or some other authentication in order to open. Opening the hood can allow access to internal parts of the cart retriever. These may include the electric motor, one or more batteries connected to the motor, circuitry such as a control circuit for controlling the operations of the retriever, e.g., forward and backward movement, operating a brake, a horn, a light, etc. (see, e.g., FIG. 4), and other components. For example, the control circuit can include the functionality of an access point described herein.

Figure 3:
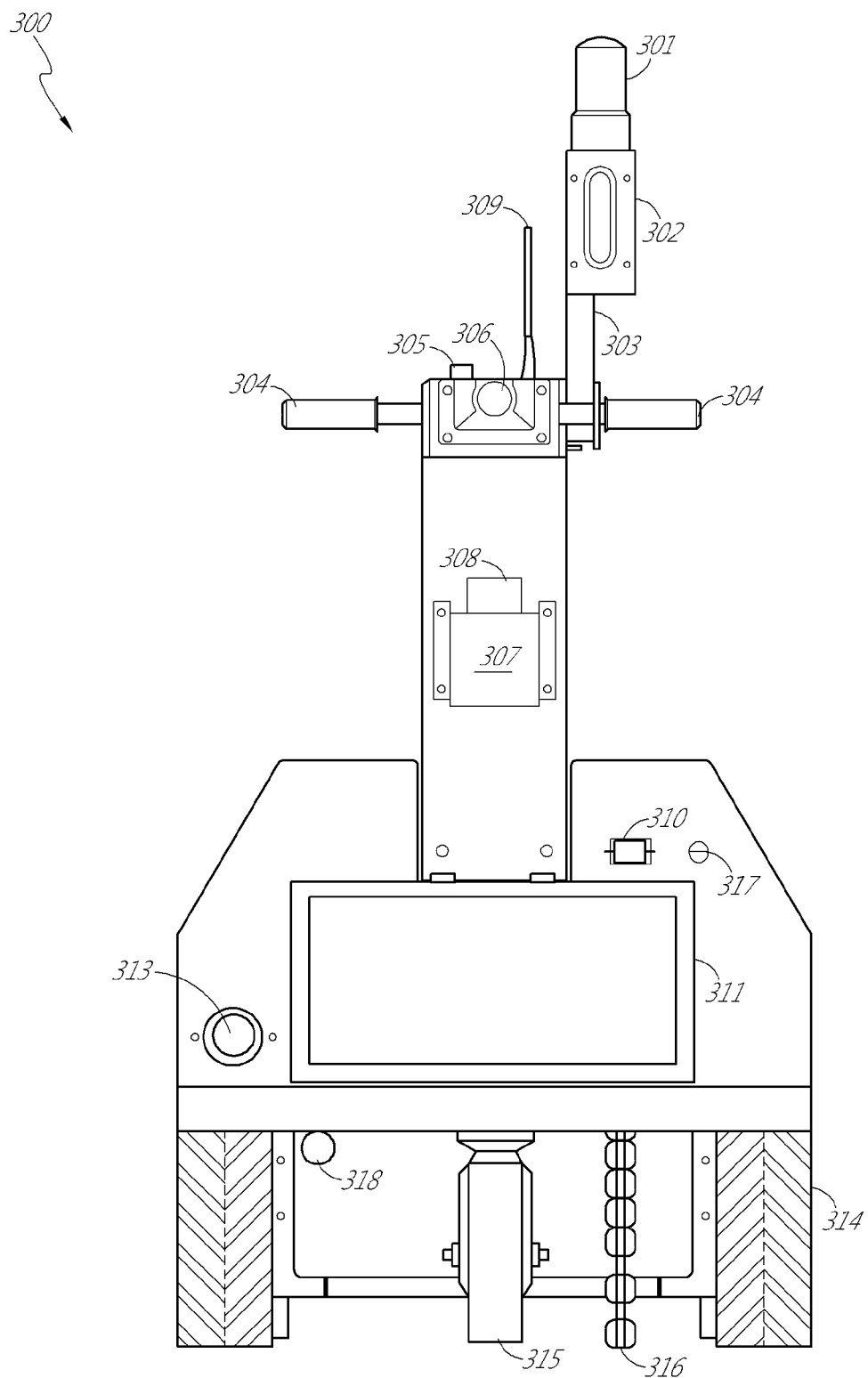
FIG. 3 shows a rear view of an embodiment of a cart retriever.

FIG. 3 shows a rear view 300 of an embodiment of a cart retriever 40. The cart retriever 40 includes a strobe light 301. The strobe light can light up, flash, or blink to alert people to the cart retriever's presence. The strobe light 301 can change its lighting pattern based on the operational state of the cart retriever 40. For example, it can change brightness, on/off duty cycle, strobe speed, color, etc. when the cart retriever 40 is stopped, moving forward, going backward, fast, slow, alone, connected to a nest 41 of carts 30, etc. The cart retriever 40 also has a brake light 302 that will light up when the cart retriever 40 is applying the brakes. The strobe light 301 and brake light 302 can be mounted on a light pole 303. The brake light 302 and strobe light 301 can be different colors from each other, such as red for the brake light 302 and yellow for the strobe light 301.

The cart retriever 40 also includes a wigwag throttle grip 304. The throttle grip 304 sends a signal to a controller that commands the motor to turn the wheels at an appropriate rate. Turning the throttle grip 304 in one direction causes the wheels to turn forward (for forward motion). Turning the throttle grip 304 in the opposite direction causes the wheels to turn backward (for reverse motion). The speed that the wheels turn can be controlled by how far forward or backward the throttle grip 304 is turned.

Braking can work in a variety of ways. In some embodiments, the cart retriever 40 will apply the brakes as long as the throttle grip 304 is not turned forward or backward, e.g., the throttle grip is in the default position. In other embodiments, turning the throttle grip 304 in a backward direction will apply the brakes instead of moving the retriever in reverse. In some embodiments, one of the left or right throttle grips 304 will control moving forward or backward, and turning the other of the left or right throttle grip 304 will cause the cart retriever 40 to brake. In other embodiments, a handle brake or a foot brake can be used. In some implementations, when the cart retriever needs to stop, it will send commands to the CTs in the nested carts to signal the CTs to apply brakes. An emergency stop button 306 can be pressed to immediately stop the cart retriever 40. Pressing the emergency stop button 306 can apply an emergency brake, cut off power to the wheels, turn off electrical systems, etc. The emergency stop button can override other commands so that even if the throttle grip 304 is turned to accelerate the cart forward, the cart retriever 40 will ignore the throttle grip 304 and instead set the emergency brake. The effect of the emergency stop button 306 can last for a duration longer than pressing of the stop button. For example, the cart retriever 40 can be in an emergency stopped state for 5, 10, 15, 30, or 60 seconds or 2, 3, 5, or 10 minutes after the emergency stop button 306 is pressed, or indefinitely until a reset button is pressed, a reset signal is received, an ignition key is turned, power is cycled, etc.

The cart retriever also includes a button 305 for a horn. When pressed, the horn can emit a loud sound to alert surrounding people to the presence of the cart retriever 40. The horn can be loud enough to penetrate through cars and reach across a parking lot. For example, if a cart 30 breaks away from a nest 41 of carts 30 connected to the cart retriever 40, then the horn can be loud enough to alert otherwise unaware people who might be in the way of the runaway cart. The horn can be automatically activated to alert operators when the battery is fully charged, when the cart begins to move, when an error condition such as wheel skidding occurs, etc.

The cart retriever 40 also includes a remote control 308 that can be placed in a remote control holder 307 for storage when the remote control is not being used to control the retriever. The remote control 308 can implement the functionality of the MCU described above. The remote control 308 can be removed and used at a distance from the cart retriever 40 by an operator to send wired or wireless control signals to the cart retriever 40. If the remote control 308 is wireless, then the cart retriever 40 can have a remote control antenna 309 to receive the wireless control signals. The remote control 308 can allow an operator to issue control signals such as to move forward (at one or more different forward speeds), backward (at one or more different reverse speed), brake, honk the horn, etc. that the cart retriever 40 can perform (see, e.g., FIG. 7B). An operator holding the remote control 308 can be at the front of a nest 41 of carts 30 to lead the direction of the nest 41 of carts 30 while commanding the cart retriever 40 to move forward or backward.

The cart retriever 40 includes a display device 310. The display device 310 can be used to indicate one or more statuses of the cart retriever 40. For example, the display device can include a screen (e.g., liquid crystal display (LCD), an electrophoretic display (e.g., ePaper), a microelectromechanical systems (MEMS) display), a series of light emitting diodes (LEDs) such as an LED light bar, a 7 segment display, etc. that indicates the current battery charge, error codes, or other information.

The cart retriever 40 can include one or more rechargeable batteries 311 inside of the unit (e.g., under the hood 304). The cart retriever can have a power cord that plugs into a power outlet in order to charge the battery 311. The power cord can be wrapped around a hook for storage while the cart retriever 40 is not charging the battery 311. In some embodiments, the power cord can be detachable from a socket 313 on the cart retriever 40, allowing the power cord to be stored elsewhere while the cart retriever 40 is in use.

The cart retriever 40 can have a plurality of wheels 314, 315. One or more of the wheels 314 can provide traction to the retriever and be connected by gears, chains, drivetrain, etc. to the motor to receive power and torque. These wheels 314 turn forward or backward when the throttle grip 304 is turned or when the forward or backward command is issued from the remote control 308. In addition, the wheels 314 can be rigidly oriented in a fixed direction. A swivel wheel 315 can provide additional support for the cart retriever 40 without being connected to the motor. The swivel wheel 315 can be connected in a way that allows the swivel wheel 315 to freely swivel or to be controlled by swiveling the handles of the of the throttle grip 304.

The cart retriever 40 can also have an anti-static chain 316, which can be a durable, conductive material that electrically couples the cart retriever to the ground so that the retriever does not accumulate a static charge. The cart retriever 40 can also have a key switch 317. The key switched 317 can receive a key to turn the cart retriever 40 on or off, and may include other positions like lock, neutral, parking etc. The cart retriever 40 can also have a brake release lever 318. The brake release lever 318 can be pushed, depressed by foot, or otherwise operated to release brakes applied to the wheels 314, 315 of the cart retriever 40 and to send a brake command signal to any nested carts that the cart retriever 40 is pushing or pulling.

Any of the components of the cart retriever 40 (including any of those described above) can be monitored for their status, which can be displayed (e.g., via the display device 310 or a display on the remote control 308) or communicated via the retriever's AP to the CCU (for analysis, reporting, or display). For example, status of the key switch 317, battery 311, throttle 304, horn, hood 204 (e.g., open or closed or locked), lights 301, 302, remote control 308 (e.g., status of button presses, identity of which remote control is associated or paired with the retriever), emergency brake 306, battery status (e.g., charge levers or charge time), and so forth can be monitored, analyzed, or reported by the controller, as will be further described herein.

Control Circuit Overview and Component Functions

Figure 4:
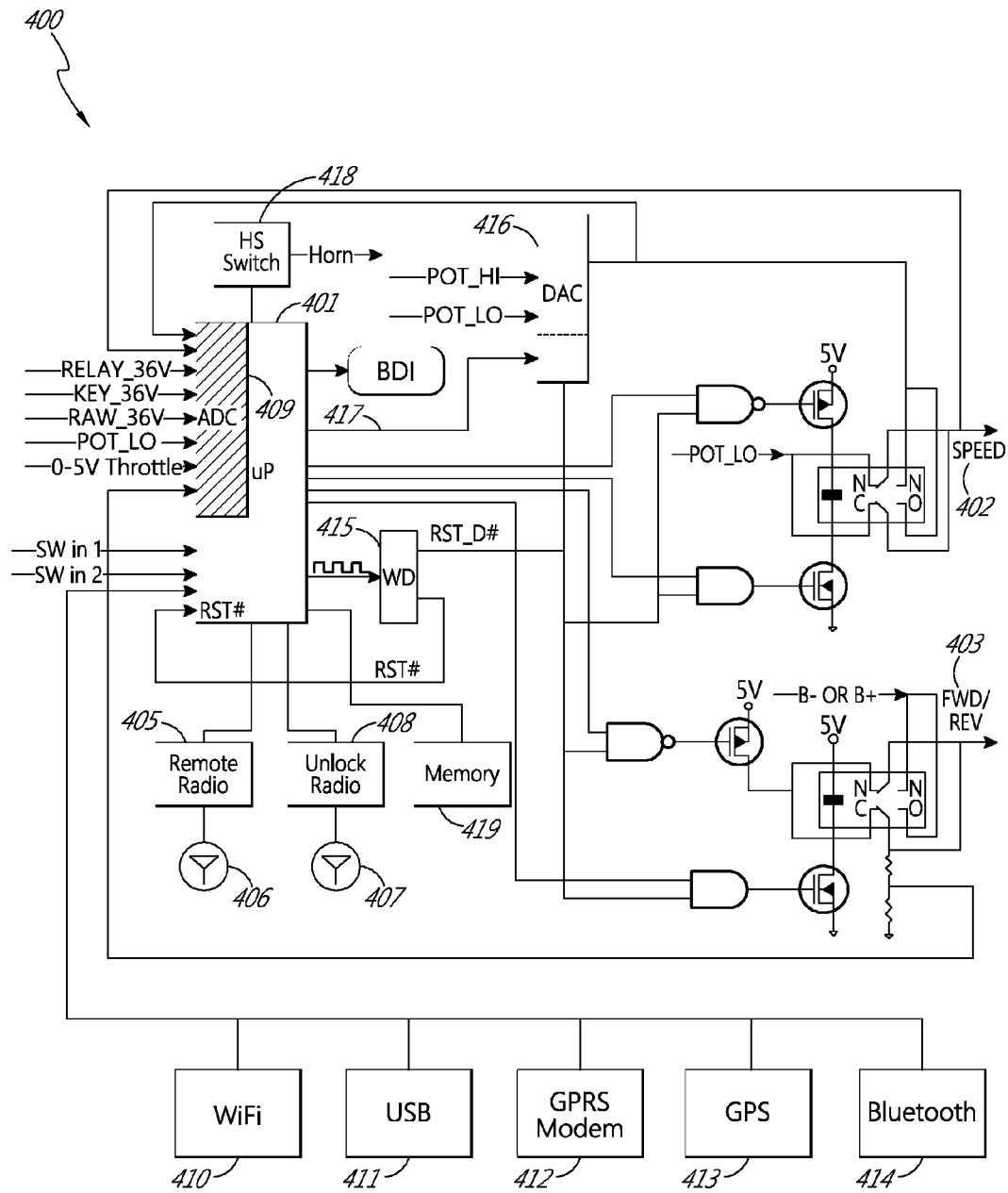
FIG. 4 shows a schematic block diagram of an embodiment of a control circuit for a cart retriever.

FIG. 4 shows a schematic block diagram of an embodiment of a control circuit 400 for a cart retriever 40. The control circuit 400 is sometimes referred to as a controller. The control circuit 400 can be used to control the operations of the cart retriever and may be responsive to a variety of inputs, e.g., from a manual throttle or a remote control. A processor or microprocessor 401 can process inputs and responsively generate output signals that operate functionalities of the retriever 40. These can include receiving input signals indicating a movement speed and direction (e.g., forward or reverse), calculating proper signals to send to a motor, setting a brake, activating a horn, etc. In some implementations, the control circuit 400 controls the motor, while in other implementations, the control circuit 400 sends control signals to a separate motor controller that controls the operations of the motor (together the circuit 400 and the motor controller can be considered the control circuit for the retriever). The control circuit 400 can be configured to implement the functionality of an access point (AP). The control circuit 400 can be configured and designed differently in other embodiments, and the example shown in FIG. 4 is intended to be illustrative and not limiting.

The circuit 400 can output a drive command to the motor. For example, the drive command can include an analog SPEED signal 402 to control the speed of the retriever and output a forward/reverse (FWD/REV) signal 403 to control whether the cart retriever 40 moves forward or in reverse. In some embodiments, the circuit 400 may combine the FWD/REV and SPEED signals into a single signal, e.g., with a first range of voltages (such as negative voltages) for REV and a second range of voltages (such as positive voltages) for FWD.

When collecting a nest of carts, it would be disadvantageous if the wheels of the nested carts were to lock (or brake) when driven over a buried VLF signal wire (or encountering a locking field from an AP). Thus, the control circuit 400 can provide a wheel unlock radio function to unlock (or keep unlocked) the wheels of nearby carts. A transceiver 408 can transmit signals from the microprocessor 401 through an antenna 407. The microprocessor can be programmed to automatically generate an unlock command while the cart retriever is moving, when it begins to move, when it detects a skid condition, etc. The unlock command can be a normal unlock command, or it can be an "unlock and do not lock for 30 seconds" command to wheels on carts that are in the vicinity of the retriever 40. Examples of cart wheels that have locking or braking functionality and provide for two-way communication are described in the '540 Patent. The unlock radio can support multiple modes of operation including, but not limited to sending unlock commands while the retriever is moving, sending unlock commands while the retriever key switch is on, and sending unlock commands while the retriever is moving for a programmable time after movement stops.

The transceiver 408 can also send and/or receive commands and status requests from an AP, a CT, the MCU, or the CCU. For example, the transceiver 408 can receive an unlock command from the CCU and then retransmit that unlock command to the CTs of nearby carts. As another example, the transceiver 408 can receive a status report command (e.g., from the CCU, AP, or MCU) and then report on various status or usage parameters, such as the battery level, extent of usage, total hours used, etc. The '540 Patent describes other commands that can be issued to a CT of a cart by the AP of the retriever.

The control circuit 400 can include a remote radio receiver (or transceiver) 405 that can receive wireless signals from the wireless remote control 308 through an antenna 406. For example, the wireless remote control 308 may send signals such as "forward" or "backward" and a corresponding speed. Although FIG. 4 illustrates a separate receiver 405 and transceiver 408, in other embodiments the functions of the receiver 405 and the transceiver 408 can be combined into a single transceiver, and the antennas 406 and 407 can be similarly combined. Usage of the transceiver for the different purposes can be time or frequency multiplexed or otherwise divided.

The microprocessor 401 can receive both analog and digital inputs. Analog inputs to the microprocessor 401 can be converted by an analog to digital converter (ADC) for processing. Although the example in FIG. 4 shows a microprocessor 401 with a built in ADC 409, some circuits can have a separate ADC for one or more input signals. Analog inputs can include signals from the key switch 317, throttle potentiometers, relays, battery voltages, interlocks, and so forth.

For example, an interlock signal can trigger when the battery is charging to prevent the retriever from functioning. Other examples of interlock mechanisms to activate the signal can include buttons or switches on the remote control 308 or cart retriever 40 that need to be held down in order for the cart retriever to function. Other interlock mechanisms include a circuit that closes only when the hood 204 is closed. In some embodiments, an interlock signal can be used to resolve conflicts between signals from the remote control 308 and the throttle grip 304.

The battery charge state can be estimated based on the current battery voltage, with a higher measured voltage indicating a higher battery charge. A battery voltage signal can be sent to the control circuit 400 and the battery charge state can be indicated to the user through the display device 310.

The microprocessor 401 has the ability to check the voltages sent to the motor drive unit for accuracy and correctness. The SPEED and FWD/REV signals are fed back to the microprocessor. The microprocessor can convert the analog SPEED and FWD/REV signals that are output to the motor controller into digital signals, and then check to make sure that the digital value is a properly calculated based on the recent or present inputs. The microprocessor can store recent input values or calculated proper output values for comparison against the SPEED and FWD/REV and account for any timing delays.

The microprocessor 401 can receive digital inputs from switches (SW) that can be placed in various parts of the cart retriever 40 to indicate whether a component or circuit is open or closed. For example, the switches can be located at the hood 204 to indicate whether the hood 204 is open or closed. Signals from the switches can be sent to the microprocessor 401 for logging or for performing a suitable action (e.g., lighting a display or LED if the hood is open).

The control circuit 400 can include a wireless network chip 410 (e.g., implementing Institute of Electrical and Electronics Engineering (IEEE) 802.11 standards or Wi-Fi), a universal serial bus (USB) port 411, a cellular communication modem (e.g., general packet radio service (GPRS) modem) 412, a global positioning system (GPS) chip 413 (e.g., to determine a GPS location for the retriever), and a short distance wireless chip 414 (e.g., a Bluetooth or Bluetooth low energy chip). In other embodiments, some or all of these modules or chips can be left out or arranged differently than shown in FIG. 4. The control circuit 400 can communicate retriever status or usage information or send or receive control commands to CTs, APs, MCUs, CCUs, using one or more of the transceivers 405, 408 or the Wi-Fi, GPRS, or Bluetooth chips.

The example control circuit 400 illustrated in FIG. 4 includes watch dog chip (WD) 415 that can be used to ensure that the circuit does not freeze or remain stuck in an error state. It can be programmed to send reset signals to the various chips such as the microprocessor 401 or a digital to analog converter (DAC) 416 if the WD 415 does not receive input indicating proper circuit functionality within a certain window of time. As a safety feature, the watch dog chip 415 can return the DAC 416 and relays to a default state (e.g., retriever not moving) if the microprocessor 401 fails.

The circuit 400 can receive commands from the remote control 308 (also referred to herein as the MCU). In some embodiments, the remote control 308 can have one or more drive input buttons that can be depressed to select the retriever speed (see, e.g., FIG. 7B). For example, in some implementations, two speed buttons are used (sometimes referred to as "Rabbit" and "Turtle", which indicate two different retriever speeds, with the Turtle speed being slower than the Rabbit speed). The Rabbit and Turtle speeds may be programmed in the microprocessor 401 or via potentiometers to suit the needs of the customer. Maximum forward and reverse speeds may also be programmed. In some embodiments, the circuit 400 supports a continuously variable remote control throttle. For example, rather than having a hand held remote control with two (e.g., Rabbit and Turtle) drive buttons, the hand held remote could include a trigger or knob.

In use, it may be possible for the control circuit 400 to receive signals from both the manual throttle 304 and the remote control 308. For example, an operator standing at the front of a train of carts may push the Rabbit button at the same time that another person turns the throttle grips 304. The control circuit 400 can be configured to resolve conflicts between commands received from the throttle grip 304 and commands received from the remote control 308. For example, in various implementations, the control circuit 400 can support single or multiple modes of conflict resolution including one or more of the following: 1) do not apply power to the motor if more than one drive input is received; 2) stop applying power to the motor if more than one input is received; 3) set the brake if more than one drive input is received; 4) obey the first drive input that is received; 5) obey the last drive input that is received; 6) obey the remote control input; 7) obey the throttle input; 8) obey the command representing the fastest speed; 9) obey the command representing the slowest speed; 10) sound the horn; or 10) flash the light.

Status Monitoring, Usage Monitoring, Fault Detection, Logging, and Reporting

The control circuit 400 can add performance, status, and usage monitoring, fault detection, event logging, and reporting functionalities, in various embodiments. For example, the microprocessor 401 can be used to detect or monitor the status, usage, and faults, and the microprocessor 401 can log the information to a memory 419. When the microprocessor receives a request to report information (e.g., from the CCU) or at various times or places (e.g., when stored for charging), it can read or otherwise cause the logged information to be transmitted. This can be done, for example, through one or more of the Wi-Fi chip 410, the GPRS chip 412, or the transceivers 405, 408. A flash drive could be connected via the USB connection 411 to receive the information, The microprocessor 401 can report the status or fault upon certain events without receiving a request. For example, the microprocessor can report faults immediately, even without logging. It can report the status after being turned on or after certain time intervals.

In addition to reporting faults as data, the circuit 400 may be programmed to visually or audibly indicate a fault or error condition. Error indication may include, e.g., honking the horn or flashing LEDs. Fault conditions can include, for example, when more than one drive input is received by the control circuit 400 (e.g., the throttle grip 304 and the remote control 308 are both active), when too many carts are loaded onto the cart retriever, when the cart retriever cannot push the carts up an incline or out of a pothole, when the battery charge is too low, when wheel skidding is detected, when the brake has not been released but an operator is attempting to move the cart retriever, when one or more circuit components fail, etc.

The control circuit 400 can limit the speed of the retriever when the battery discharges to a programmable level to prevent battery damage. The circuit 400 may also be programmed to indicate that it is operating in "low battery, speed limited mode" by honking the horn or flashing LEDs.

The circuit 400 can monitor the various performance, status, usage, or battery parameters, and can report the data to the CCU. In some cases, the CCU may permit customers to login (e.g., via a user interface), in order to view information about the monitored retrievers and view usage reports.

Parameters that may be monitored and reported by the retriever can include but are not limited to one or more of the following parameters categories: 1) battery parameters, 2) time usage parameters, 3) location usage parameters, 4) speed usage parameters, and 5) miscellaneous parameters. These categories are intended to illustrate the types of parameters that can be monitored but the categories not intended to be limiting or mutually exclusive. Further, describing a parameter as falling under one of the categories (for purpose of illustration) does not mean that the parameter could not also be categorized in one or more other categories.

1) Battery Parameters

The current battery charge level can be recorded for the retriever, the carts, or the remote control 308. The current battery charge can be estimated, for example, by measuring the voltage or current supplied by the battery. The battery charge (or capacity) in a cart transceiver (e.g., a battery in the wheel), in the retriever itself, or in a battery-operated remote control can also be measured and communicated to the control circuit 400. Other parameters can include whether a battery is currently charging, the duration of battery charging, the charge (or discharge) state of a battery, maximum or minimum battery voltages, currents, charges, or capacity, the age of the battery, and when the battery was last charged, repaired, or replaced in a retriever. For example, the charge state can reflect a current charge state or a charge state when the battery is disconnected from the charging source (e.g., fully charged, partially charged, a percentage charge, etc.). The battery parameters can be collected for each battery in a retriever (e.g., some retrievers include two, three, four, or more batteries).

These parameters can be used, for example, to determine if a battery needs replacement, service, or recharging. For example, gathered data relating to battery levels can be analyzed to determine that a battery needs to be replaced (not just recharged) if a cart retriever has been connected to a power source, has charged its battery for an extended period of time sufficient to fully recharge the battery, was disconnected from the power supply so that it stopped charging, reported a low maximum battery voltage, current, power, or capacity after an extended charging period, or the retriever was operated for only a short amount of time and pushed a small number of carts before the battery ran out. Different combinations of these parameters can be used to determine when a battery needs to be replaced. For example, a battery that is more than three years old may need to be replaced regardless of any other parameters. If a retriever, cart, or remote control reports a low battery level, then a communication (e.g., electronic mail, text message, or other alert) can be sent to a supervisor so that an employee can be sent to charge. service, or replace the battery.

This information can also be used to forecast useful lifespans and maintenance needs of carts and cart retrievers. The controller can monitor and record the charge state (voltage) of the CM battery(s) as well as the charging times and durations of charging. The controller can also report the battery charge state via an LED light bar.

Since many retrievers, transceivers, and remote controls are battery operated, the foregoing status and usage parameters have been described with reference to a battery (typically, but not necessarily, a rechargeable battery). In other implementations, retrievers, transceivers, remote controls (or other components) can be powered (additionally or alternatively to batteries) by power sources such as ultracapacitors or supercapacitors, fuel cells, etc. In such implementations, any of the foregoing parameters (described with reference to a battery) can be monitored for the particular type of power source used in the retriever, transceiver, remote control, or other components associated with the cart retriever.

2) Time Usage Parameters

A variety of status or usage parameters can be collected for the retriever 40, the carts 30, and the remote control unit 308. These can include the total time that a unit is powered on, the current uptime, the total driving time, timestamps (e.g., time when a trip starts or ends), average usage duration, etc. Some of these time usage parameters can be calculated by an internal clock in the circuit 400. Some of the time usage parameters such as a timestamp can be based, at least in part, on an initial time or synchronization signal broadcast from the CCU, AP, MCU, etc. Time usage parameters relating to the retriever and the remote control can include the retriever driving time when controlled by the remote control, the retriever driving time when controlled by the manual throttle, the retriever driving time spent using a high speed (e.g., Rabbit), the retriever driving time spent using a low speed (e.g., Turtle), the duration of a cart retrieval trip (e.g., when one or more carts are coupled to the retriever), the total duration of a cart retrieval trip (e.g., whether or not the retriever is coupled to a cart), or the amount of time spent idling (e.g., when the key switch is on and the retriever is not moving). Time duration parameters can include an average trip time beginning from a particular starting point, an average time to end at certain stopping points, or a number of stops per trip (e.g., to add additional carts to the train). The time usage parameters can be for a particular cart retrieval trip, a group of cart retrieval trips, a period of time (e.g., daily, weekly, weekends, nights, etc.) or can reflect cumulative times (e.g., total time being operated from a fiducial time).

When collected, these parameters can be used to generate reports and statistics helpful for managers. For example, shopping center managers often send employees to collect shopping carts from parking lots. When the employees can use a cart retriever to collect shopping carts, the trip time can be reported. This information can be analyzed by the CCU to compare how effectively the retrievers are deployed at a store. As another example, the total time that a unit is powered on may reflect the age of a unit. If a cart has been powered on for a significant time (or has a battery that has experienced a relatively large number of charge/discharge cycles), then this can indicate that the battery will likely need to be replaced. As another example, a high total driving time of a cart retriever can indicate higher wear and tear than a second cart retriever, even if both cart retrievers are the same age. This information can be used to allow operators to try and use cart retrievers evenly in order to distribute the wear and tear.

3) Location Usage Parameters

Location parameters of the retriever, the carts, and the remote control can also be monitored. These parameters can include a location based on the proximity of the retriever (or a cart coupled to the retriever) to a known reference point such as an access point, a location determined based on RSSI values from multiple reference points, or a location determined based at least in part on a GPS position. The number or location of carts can be determined with respect to cart retrievers, for example, using the queue count estimation techniques disclosed in the '540 Patent. The controller can use a GPS module to determine and monitor a path that the retriever follows. This information can be combined, for example, with the timestamp data to calculate a GPS determined speed. The retriever location can additionally or alternatively estimated by determining when the retriever (or a cart coupled to the retriever) enters a "zone" established by directional antennas and APs, as described in the '540 Patent. The history of the zones entered (or exited), the identification of the AP associated with each zone, etc. can be monitored. In some implementations, a cart wheel can include a magnetic navigation system that estimates cart position using dead reckoning techniques. In some such implementations, the location of the cart retriever can be determined based on the estimated location of one or more wheels of the carts being collected by the retriever.

In some cases the cart's CT can include circuitry to determine location of the cart, e.g., by using GPS, AP zone entry/exit, or using a magnetic navigation system. As discussed, the CT can be disposed in various places in the cart including the wheel, the frame, and/or the handlebar of the cart. The control circuit 400 can communicate with the CT to receive the location information from the CT. The control circuit 400 (or the CT or a CCU such as a fleet management system 500 shown in FIG. 5) can determine whether the cart (or retriever) is following a preset path, e.g., established by the store for efficient or optimal cart collection by operators of the retriever. The control circuit 400 or the CT can communicate operator compliance information to the CCU (e.g., whether the operator followed the preset path, an extent of deviation from the preset path, etc.). The control circuit 400 or the CT can communicate operator compliance information to the remote control 308, which may display on the display device 750 a warning to the operator if the cart or cart retriever is straying too far from the preset path. In some cases, the cart retriever may apply a brake, cut power to the retriever motor, or sound a horn or light a light, if the operator is not in compliance with following the path (e.g., strays beyond a threshold distance from the path). In some implementations, the path may include collection times that the operator is to meet in order to efficiently collect carts. The CT or the control circuit 400 may monitor compliance by the operator with directing the cart along the path at the appropriate speed to meet the collection times and report operator compliance with the meeting the collection times, communicate a warning (e.g., "Slow Down" displayed on the remote control 308), or take some other corrective or remedial action if the collection times are not being met.

Location parameters can enable a manager to identify where scattered carts are located when they need to be retrieved, to determine if whether the number of stored carts is sufficient, if the number of stored carts is too low and scattered carts need to be returned to storage, or operator compliance with following a preset collection path or collection times. In addition, data such as where the cart retrievers or carts have been (and for how long) can be used to determine traffic patterns of cart operators. At a retail store, for example, this can data be analyzed by the CCU to see which areas of a store parking lot tend to accumulate carts, efficient or optimal collection paths for the retrievers to follow, optimal times for collecting carts, and so forth. In addition, location data can be used to determine which carts have been collected by a particular cart retriever, statistics on the number of carts collected per retriever per trip (e.g., average, maximum, minimum, variances, etc.). Location data can also be used to determine whether or not carts or cart retrievers moved into, stayed in, and left certain areas in the store or parking lot. In the shopping context, this can indicate whether or not shoplifting occurred. In a shopping cart context, indicating that a shopping cart that did not move into an area around the cash registers, stop, remain there for a period of time, and exit the cash register area before exiting the store can be an indicator of shoplifting.

4) Speed Usage Parameters

Speed usage parameters of the retriever, the carts, and the remote control can also be monitored. This can include monitoring the average speed per trip (e.g., when loaded with carts), average speed overall, maximum or minimum speeds, etc. The speed can be calculated based on location parameters (e.g., determined by RSSI values or determined from using the GPS positions) and time parameters. In some cases, the retriever may have controller functionality that estimates speed (e.g., by monitoring motor output) or a tachometer or other device that measures speed.

The speed of the retriever can be used to provide other functionality. For example, if an operator is moving the retriever above a threshold (or safe) speed, display device on the retriever (or the remote control) can display a warning to the operator to slow down. If sufficient time passes and the retriever remains above the threshold speed, the control circuit 400 can perform a corrective action such as cutting power to the motor or applying the brake.

The control circuit 400 (or the CCU) can use various definitions for a trip when calculating usage data. For example, a cart retriever can begin a trip when it is powered on and end the trip when it is powered off. A trip can begin when a cart is first attached to the retriever and end when the last cart is removed from the retriever. As discussed herein, the queue estimation methodology of the '540 Patent can be used to determine proximity of a cart (typically, a CT in a cart wheel) to the retriever. Thus, the control circuit 400 can use the queue estimation logic of the '540 Patent to determine the number of carts being collected (e.g., the number of carts within a threshold distance, typical of a length of a cart train, of the retriever). For a cart, the trip can last from when it leaves and returns to a storage corral or when it enters and exists a building. Trips can also end when the cart reaches certain access points such as those at the checkout lane or when it reaches a certain MAG or EAS.

5) Miscellaneous Parameters

Other miscellaneous parameters can also be monitored. This can include the number of carts loaded onto a cart retriever, the identities of the carts (e.g., a unique CT identification code), the number of simultaneous throttle signals (e.g., from the throttle grip and from the remote control), the number of times that the horn has activated in a trip, or the fault history of any detected faults (e.g., error conditions or low battery). Typically, a single remote control is associated with the AP in the retriever (e.g., by pairing) so that only the associated remote control can control the retriever. The control circuity can monitor the remote control association time and history (e.g., when, where, and how often the remote control was associated with retriever, swapped or changed). The circuit can monitor the identity of the remote control that is associated with the retriever (e.g., a unique remote control ID used in pairing the retriever and the remote control). The circuit can monitor whether there are attempts to try to associate a second remote control with the retriever, after a first remote control has been associated with the retriever. Other miscellaneous parameters can include maintenance history of the retriever, when and for how long the hood is opened, etc.

The CT in each cart can communicate status information associated with the cart, cart wheel, the CT itself, and so forth to the control circuit of the retriever for logging and analysis. In some implementations, the wheel includes a brake (or motion inhibition mechanism), and the CT can communicate the state of the brake to the retriever (e.g., unlocked, locked, fully braked, partially braked, etc.). The wheel may also include other components whose status or usage can be reported by the CT to the control circuit of the retriever for monitoring. Examples of such components that can be monitored include (but are not limited to) a power generator that generates electrical power from the rotation of the wheel, a magnetic navigation system that estimates a location of the wheel using magnetic dead reckoning techniques, a vibration sensor for detecting wheel skid events, a temperature sensor, a wheel rotation sensor, a heading sensor (e.g., a compass), a motion sensor, a magnetic field sensor, an orientation sensor (e.g., an accelerometer, a gyroscopic sensor, a magnetometer, etc.), and so forth. Examples of wheel components that can be monitored are described in U.S. Pat. Nos. 7,658,247, 8,046, 160, and 8,820,447; each of the foregoing patents is hereby incorporated by reference herein in its entirety for all each patent discloses, so as to form a part of this specification.

In some implementations, the cart may include a display unit that attaches to the shopping cart's handle (or elsewhere on the cart). The display unit may display ads, messages, or other information to a store's customer. The control circuit in the retriever can communicate with the display unit (typically, via the cart's CT) and may log information from the display unit such as, e.g., what ads or information were communicated to the store's customer.

A number of any of the foregoing (or other) parameters that are monitored by the control circuit 400 can be aggregated in order to gather information about the cart retrievers and the carts. A cart fleet management system (e.g., the network system 500 described with reference to FIG. 5) can aggregate 5 or more, 10 or more, 15 or more, 20 or more, or 25 or more of these parameters in order to generate an overall picture of the health or status of the system or any component of the cart and cart retriever fleet. The system can display the results through a user interface provided by the CCU (see, e.g., FIG. 7A).

The CCU can combine any of the parameters to provide different indications of the health or status of a cart retrieval system. For example, various indicators of battery health of a cart retriever can be combined with the average usage time of a cart retriever before its batteries discharge in order to determine if a battery is no longer good. As another example, location parameters and speed parameters can be used to determine traffic of cart collection, enabling managers to redesign or relocate pathways or collection areas to for better accessibility. As another example, the useful battery life of a cart retriever can be estimated based on past usage. The central control unit can use data mining techniques to, for example, estimate, based on how quickly a cart retriever used its battery power in the past while pushing a certain number of carts for certain durations at certain speeds, how many carts a cart retriever can push for how long at certain speeds based on a current battery level.

System Features

Figure 5:
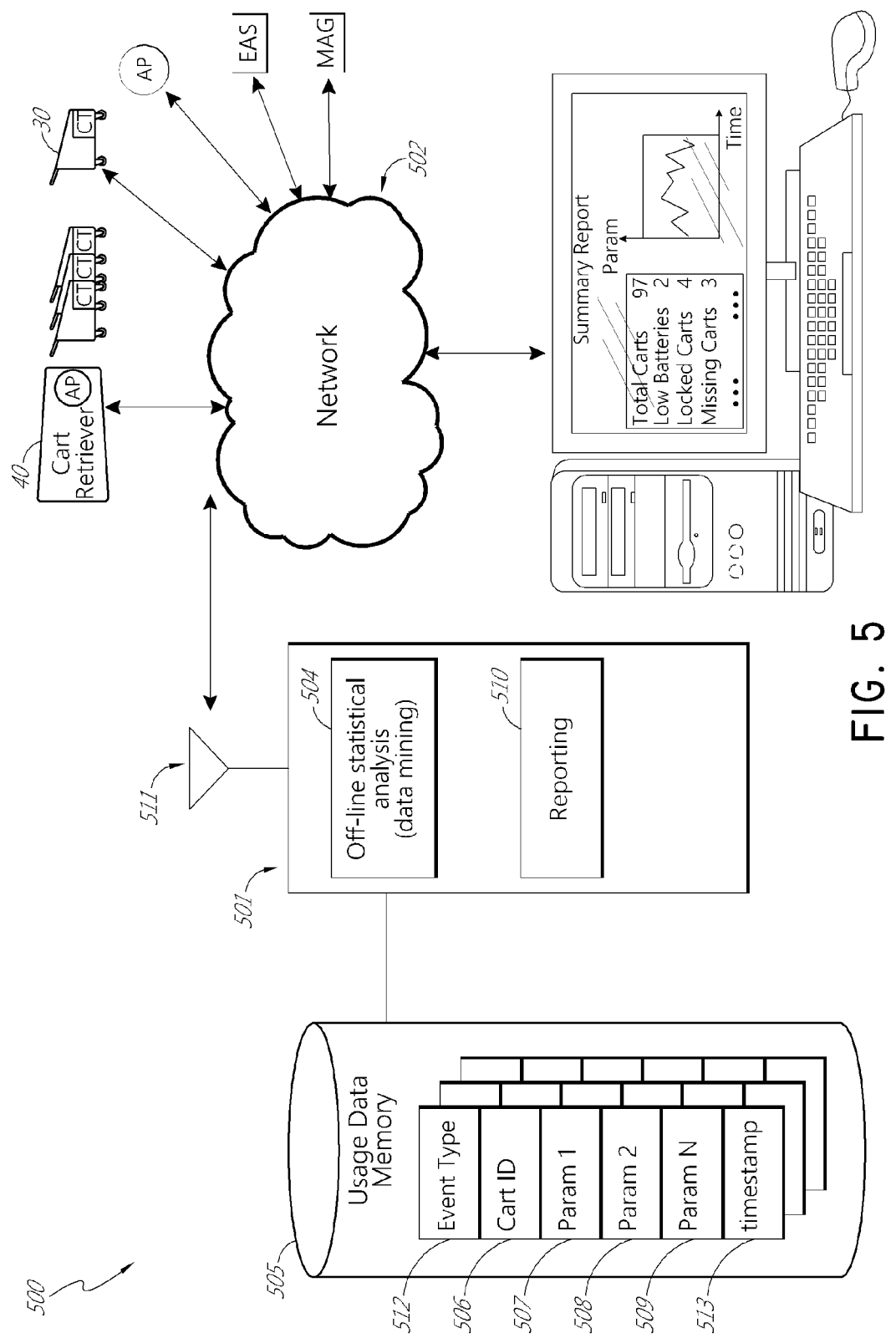
FIG. 5 illustrates an example computer and network system for managing or monitoring cart retrievers.

FIG. 5 shows an illustration of an example network cart fleet management system 500 for managing or monitoring carts or cart retrievers. A central control unit (CCU) 501 is configured to analyze cart or cart retriever event data (cart fleet event data) acquired via communications through a network 502 with the access points in cart retrievers 40, cart transceivers (CTs) in carts 30, access points (APs) distributed throughout or near a facility (e.g., a store and its parking lot), electronic article surveillance towers (EASs), and mobile control units (MCUs). The communication can be one-way or two-way in various embodiments. The event data can comprise any of the status or usage parameter described herein, including but not limited to any of the 1) battery parameters, 2) time usage parameters, 3) location usage parameters, 4) speed usage parameters, and 5) miscellaneous parameters. The CCU 501 can be implemented on computing hardware, which can include a computing device programmed with specific executable instructions. The network 502 can be a wireless network that supports Wi-Fi or a cellular protocol such as GPRS. The network 502 can be configured as a wide area network (WAN), local area network (LAN), personal area network (PAN), or other type of network. The network 502 can include connection to the Internet. In some embodiments, the CCU and other devices can communicate directly to each other without intermediary routing hardware, such as through a Bluetooth communications. The CCU and other devices can also connect to the network through wired mediums, such as through Ethernet cables. The CCU can also communicate wirelessly through one or more antennas 511. An end user is able to use an interface on a computing device 503 to access the stored data and reports, to generate data or statistics, and so forth. The computing device 503 can include a desktop computer, a tablet, a smartphone, etc.

As illustrated in the example shown in FIG. 5, the CCU receives cart event data substantially in real time as such data is retrieved or generated by the access points. Each such event may, for example, include an event type 512, an event timestamp 513, the ID 506 of the access point (AP) reporting the event, the ID of the cart transceiver (CT) to which the event applies (if applicable), and any associated data. Events can include any of the parameters and data inferred from the parameters. For example, an event may specify that AP#1 detected CT#2 enter into its zone at a particular time, and that CT#2 reported an RSSI value of X. In the case where CT#2 is in a cart being collected by a retriever having AP#3, events may include that AP#1 detected entry of AP#3 in its zone at substantially the same time that CT#2 entered its zone and that AP#3 reported an RSSI value of Y. The entry (and/or exit) of CTs and the cart retriever access points into the various zones of the APs permit the determination of the path taken by the retriever and carts. GPS information (e.g., from the GPS chip 413) or cart wheel magnetic navigation location estimates may additionally or alternatively be used to determine the path of the retriever. The CCU 501 may analyze substantially simultaneous events such as these to independently confirm the number of carts being moved by a retriever as well as the path taken by the carts and retriever.

As parameters are reported and received, the parameters can be logged and saved into a usage data memory 505. The memory can include nonvolatile, non-transitory data storage. The usage data memory can be organized to log parameters 507, 508, 509, to associate the parameters 507, 508, 509 with an identification 506 that represents the source of the parameter, for example, a cart ID, cart retriever ID, or a remote control ID, AP ID, etc. The identification 506 and log parameters 507, 508, and 509 can also be associated with an event type 512 and one or more timestamps 513. In addition, the log can remove any received duplicate entries, for example, if a cart transmitted a timestamp that was received by both a nearby cart retriever and an access point, both of which retransmitted the timestamp and associated cart ID to the CCU.

The component 504 labeled "off-line statistical analysis" is responsible for analyzing the user data memory 505 to mine various types of information. One type of information that can be mined is information regarding the effectiveness of a cart retrieval schedule of operations. For example, by collectively analyzing cart retriever histories and cart histories (e.g., cart locations, collection trip paths, times, number of carts collected, and so forth), a determination may be made that carts frequently remain in the parking lot at times of high customer demand and the cart collection schedule can be updated so that these carts are returned to a collection area for customer use in advance of times of high demand. Additionally, the off-line statistical analysis component 504 may be used to determine statistics related to the shopping cart inventory of the store and parking lot, for example, the total number of carts physically present on the premises, wherein on the premises (e.g., inside the store or in the parking lot), the number of carts in active use over specific time periods, the number of cart retrievers in active use over specific time periods, which firmware revisions (and associated functionality) are present in the store's cart and cart retriever inventory, etc.

A reporting component 510 generates a report of the events or parameters in a format that can be displayed through a user interface on the computer device 503. The user interface can allow for access to reports, events, or parameters in an interactive manner so that a user can interactively select what types of reports events, or parameters they want to see.

As an example embodiment of the network system 500, the control circuit 400 of the retriever 40 monitors the various parameters described herein and reports the data to the central computerized monitoring system 500. Users can access a dashboard which provides a user interface for the user to view information about the monitored retrievers and view usage reports.

The control circuit 400 can report monitored parameters to the system 500 via the network 502 using transceivers 405, 408 the Wi-Fi chip 410, the Bluetooth chip 414, or the GPRS modem 412. In some implementations, when the unlock transceiver 408 of a cart retriever 40 is not transmitting unlock commands, it can listen for status requests from the CCU 501. Upon receiving a status request, the control circuit 400 can transmit stored parameters for both itself and for carts. Between receiving status requests, the monitored parameters can be stored in the non-volatile, non-transitory memory 419 until transmitted to the CCU 501 and an acknowledgment message is received.

The control circuit 400 can similarly communicate with CT's to receive monitored parameters from carts. The control circuit can broadcast status requests for nearby CT's to report monitored parameters. Upon receiving a status request, a cart will transmit its own stored parameters to the control circuit. Between receiving status requests, the monitored parameters can be stored in a memory on the cart until transmitted to the control circuit and an acknowledgment message is received.

The system 500 can feature both unidirectional and bidirectional communication protocols. The communication protocol can be unicast, multicast, or broadcast, as the case may be for a particular network configuration. For example, the control circuit 400 can bidirectionally communicate with a CT when the control circuit sends a status requests to the CT, the CT responds by sending monitored parameters to the control circuit, and then the control circuit responds with an acknowledgement signal. As an example of unidirectional communication, the control circuit can broadcast to all nearby carts to unlock so that the cart retriever can collect and push carts. In this example, the control circuit does not need any response from the CT, so only a unidirectional protocol and hardware is required. As another example of unidirectional communication, parameter reporting can be unidirectional. In some embodiments, the monitoring system 500 system does not send status requests for parameters. Instead, carts or cart retrievers can periodically transmit monitored parameters to the system 500 at certain time intervals (once a day, twice a day, every hour, etc.) or upon certain events (when near an access point, when entering a store, when charging, when in a cart corral, when connected to a certain network, etc.).

Figure 6A:
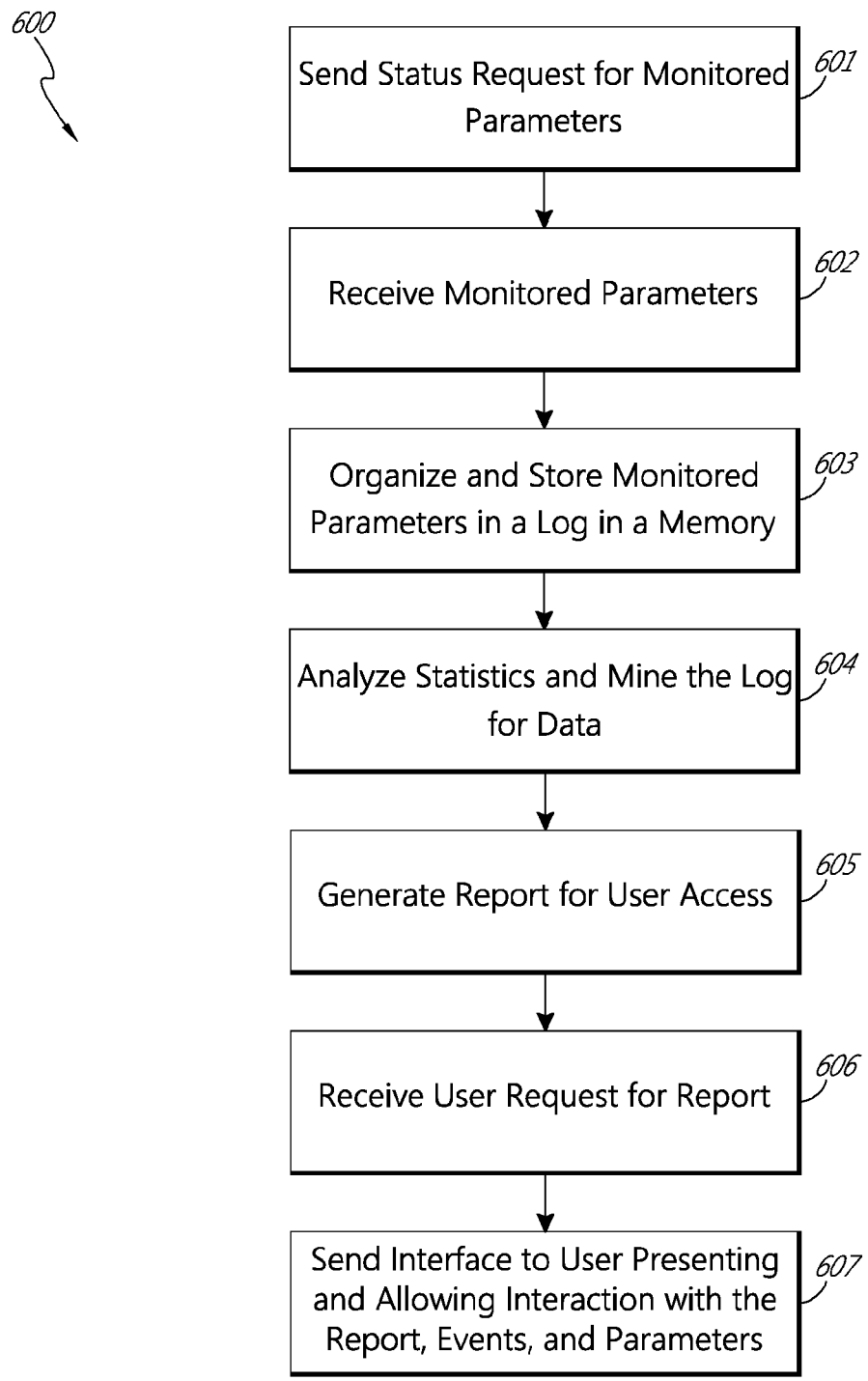
FIG. 6A shows a block diagram of an example method for managing or monitoring cart retrievers.

FIG. 6A shows a block diagram of an example method 600 for managing and monitoring carts. At block 601, a CCU sends a request for monitored parameters to APs, CTs, MCUs, etc. This request can be sent through a network, such as network 502, and may include direct wireless communications. At block 602, the CCU receives monitored parameters from access points, cart retrievers, CTs, MCUs, or EASs. The CCU can optionally reply with an acknowledgement of receiving the monitored parameters. At block 603, the CCU can organize the monitored parameters and store the monitored parameters in a log in a memory. It can organize the data by timestamp or in a way that reflects a parameter's association with the originating device of that parameter. At block 604, one or more processors in the CCU can analyze statistics and mine the log for statistical correlations, operating metrics, efficiency parameters, etc. At block 605, the CCU can generate a report for user access. Upon receiving a request for a report at block 606 the CCU can communicate the report to a computing device that presents and allows interaction with the report, events, and parameters at block 607. The interface can be, for example, in the form of a website.

Figure 6B:
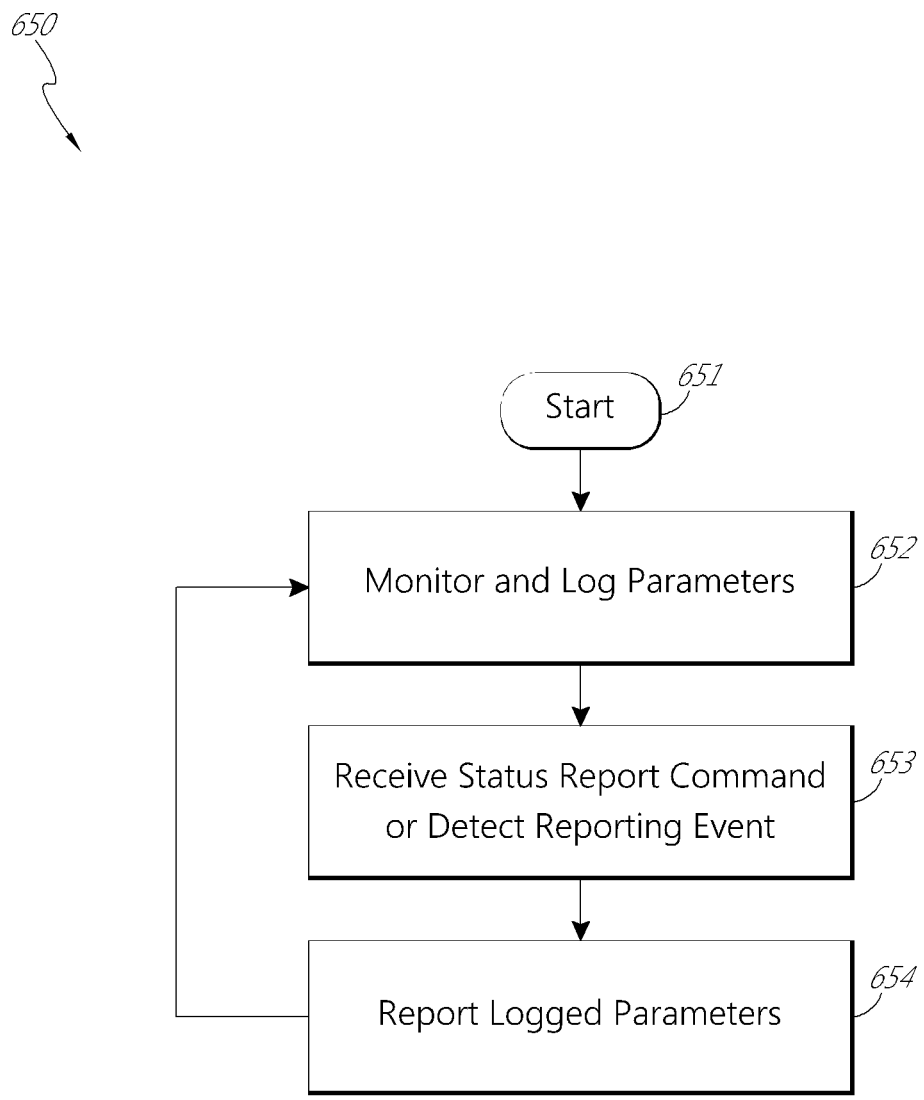
FIG. 6B shows an example block diagram of a method for a cart retriever to monitor or report status or usage parameters.

FIG. 6B shows a block diagram of an example method 650 for carts (or cart retrievers) to monitor and report parameters. The method can start at block 651. At block 652, a CT can monitor and log parameters of the cart. At block 653, the CT can receive a status report command or detect a reporting event. The status report command can be sent from a cart receiver and can be received through an antenna on the CT. Alternatively, the CT can detect a reporting event. For example, the CT can be programmed to report daily or hourly or upon arriving at certain locations (e.g., near an access point). At block 654, the CT can report the logged parameters by wireless transmission to an antenna in a circuit in a cart retriever, to an access point, or a central control unit, or to the network. After reporting the parameters, the CT can return to block 651 and continue to monitor parameters. Although the method 650 has been described for a CT, the method 650 can also be performed by the control circuit 400 or an access point in a cart retriever.

User Functionality

Figure 7A:
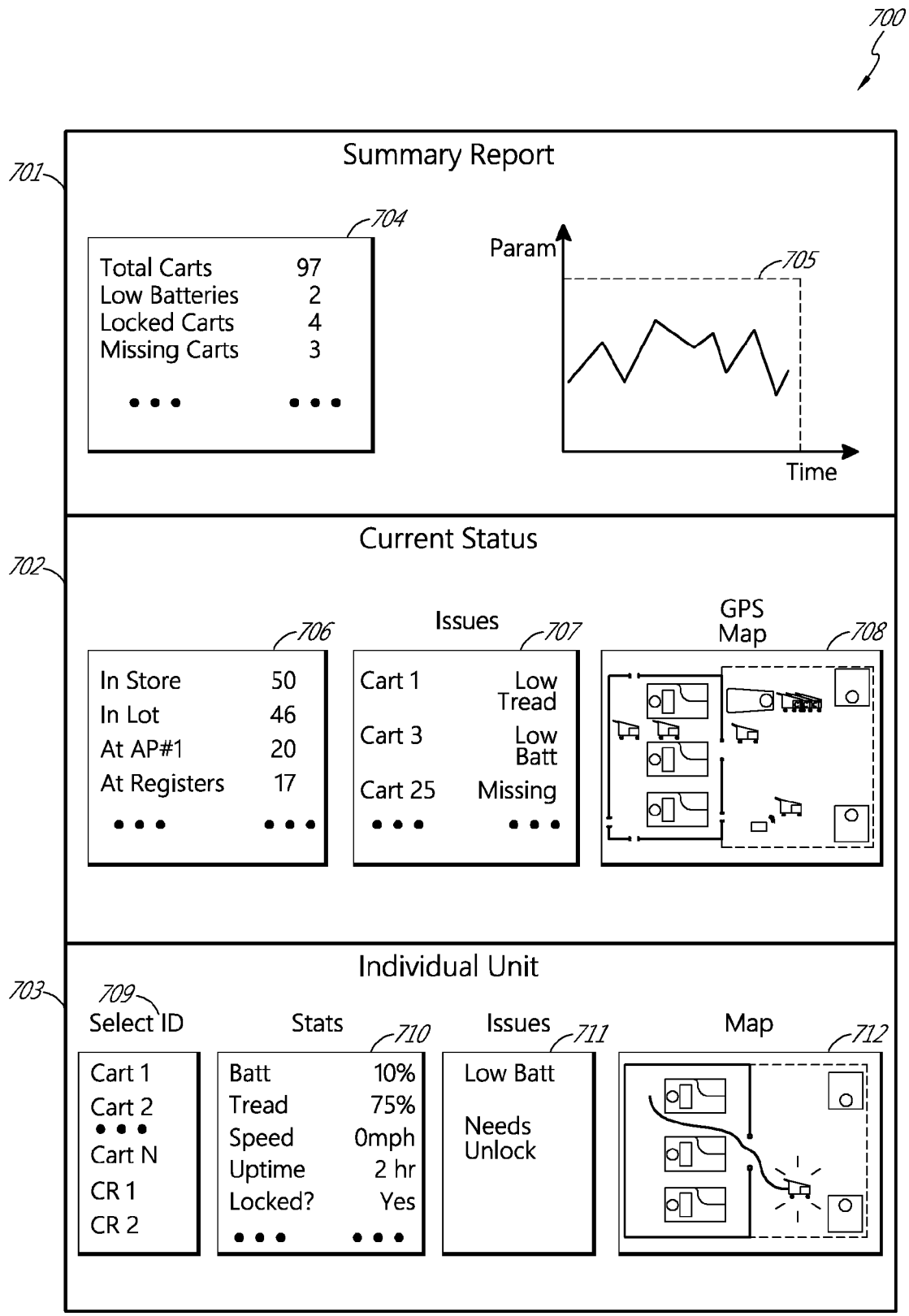
FIG. 7A shows an example of a user interface for interacting with a network system for managing or monitoring cart retrievers.

FIG. 7A shows an example of a user interface 700 for interacting with the network system 500 for managing and monitoring carts. The user interface 700 shows an example of a summary report 701 that can be generated by the system 500. For example, the user interface 700 can be displayed on the computing device 503. Summarized reporting can identify various aspects of the cart retriever and cart system. For example, the CCU can determine whether or when batteries may be nearing the end of their service life based upon the charge/discharge behavior as monitored by the control circuit of the retriever. The CCU 501 can perform offline data analysis to evaluate the information collected by the control circuits of the cart retrievers and can generate these reports for viewing or further analysis. It is also possible (by combining various monitored and collected status information) to compare the actual track of the vehicle (e.g., cart or retriever) collected via GPS (or AP zone entry/exit or by a magnetic navigation system in the cart or retriever), the speed of the vehicle, the number of starts and stops of the vehicle, to a preset, optimal, or desired route for collecting carts in a parking lot. The CCU can determine if the vehicle adhered to the preset, optimal (or desired) route and report operator compliance to a system manager. By monitoring the motor current during retrieval operations the control circuit can report this data to the monitoring system 500 for data mining and statistical analysis, and variance reports can be generated identifying the over loading of the vehicle or the underutilization of the cart retriever.

The summary report 701 can provide statistical information aggregated from the monitored parameters of the cart retrievers and carts. For example, report data 704 can report (over a time period), the total number of carts retrieved, average number of carts retrieved per cart retrieval trip, an average duration of cart retrieval trips, an average path length of the cart retrieval trips, an average speed of the retriever during cart retrieval trips, an average number of stops made during the cart retrieval trips, the total number of cart retrievers (or carts) with low batteries, battery charge status of the cart retriever(s), total number of carts with locked wheels, missing carts, etc. The summary report can also show graphs 705 of parameter trends over time. Additionally or alternatively, rather than average statistics, the statistical information can include a median, mode, standard deviation, variance, or any other statistical measure.

A current status section 702 of the report 701 can present the latest known information about carts and cart retrievers. A section 706 can report present information such as the number of carts at certain locations. Another section 707 can report current issues, such as whether carts or cart retrievers have low batteries, low tire tread, are locked, are missing, etc. A map 708 can display the last known location of carts and cart retrievers or to represent traffic.

The user can interact with the status section 702 in a variety of ways. Clicking on or hovering over certain parts of sections 706 or 707 can cause the map 708 to highlight the locations of carts that fit certain categories (e.g., carts with low batteries or carts with locked wheels). Clicking on or hovering over certain parts can also cause the interface to display more details, link to another page, or cause the individual unit section 703 to show data about certain units.

An individual unit section 703 of the report 701 can allow the user to interactively see certain types of data. The user can select an identifier (ID) from a list 709 of available ID's of carts, cart retrievers, and remote controllers. The list can update to show only certain ID's, for example, if a user clicks to show only ID's of carts with low batteries. When the user selects an ID from the list, the interface will display statistics 710 about that individual unit. These can include the monitored parameters and events. Any issues with the selected unit can be shown in a section 711. A map 712 can show the selected unit and also the trail that the selected unit took.

The user can interact with the summary report to show different graphs of different parameters or events over different periods of time. For example, clicking or hovering a mouse pointer over report data 704 can cause the interface to display more details (such as the ID's of carts), link to another page of the report, or cause the current status section 702 or individual unit section 703 to show data about one or more selected categories of units.

Figure 7B:
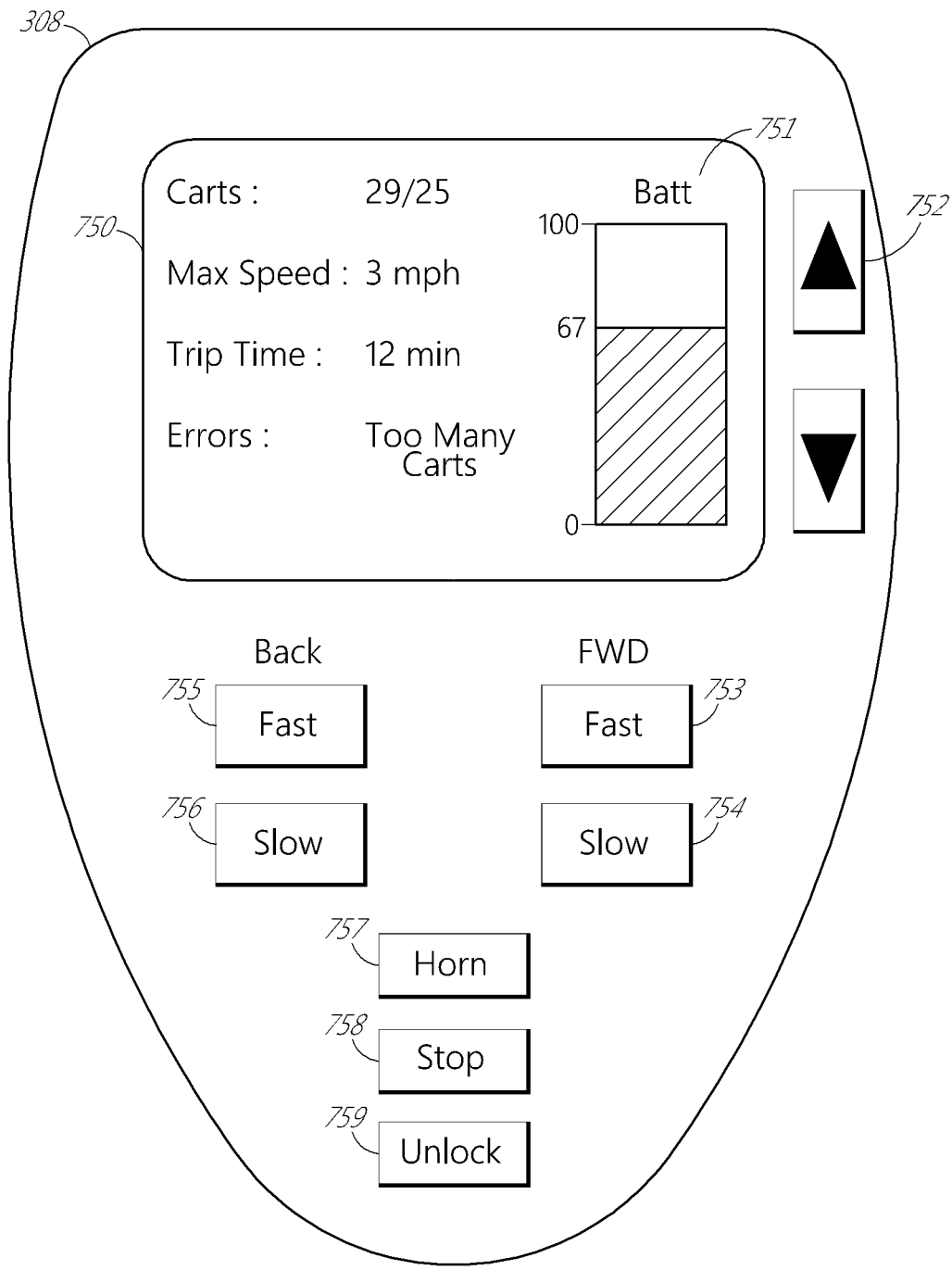
FIG. 7B shows an example of a remote control for controlling a cart retriever.

FIG. 7B shows an example of a remote control 308 for controlling a cart retriever. The remote control 308 is associated with the particular cart retriever for which it will be used for control (commonly called pairing). The remote control 308 can also interact with the network system 501 for managing and monitoring carts. The remote control 308 has a screen 750 for displaying a user interface with status or usage information. The screen can show status information for the cart retriever 40 it is paired with and the carts that have been collected by the retriever. The remote control 308 can receive the status information from an access point of the retriever, an access point elsewhere in the retail facility, or the CCU. As an example of status information, the user interface can indicate a battery level 751 of the cart retriever (or a battery in the remote control) as a percentage, a bar graph, etc. The screen can also show helpful data such as the total number of carts being pushed by the cart retriever with reference to a recommended maximum number of carts (and indicate an error if too many carts are pushed), the speed of the retriever, the trip time, and any error statuses such as pushing too many carts, low battery, steep incline, cart wheels are locked, skid detection events, etc. Buttons 752 can allow an operator to scroll up or down to see more status information.

Other buttons on the remote control 308 can send commands to the cart retriever 40 to move forward at the fast 753 (e.g., Rabbit) or slow 754 (e.g., Turtle) speeds or backward at the fast 755 or slow 756 speeds. Other buttons can include functions to honk the horn, apply the brakes 758 ("stop"), or send an unlock command 759 to wheels of nearby carts.

Additional Aspects and Examples

In a first aspect, a retriever for shopping carts is disclosed. The retriever comprises an electric motor, a battery electrically connected to the electric motor, a cart connection assembly configured to couple a shopping cart to the retriever, a bidirectional wireless radio frequency (RF) transceiver, and a control circuit in electrical communication with the electric motor and the RF transceiver. The control circuit is configured to: communicate a drive command to the electric motor, monitor a battery parameter associated with the battery, monitor a retriever usage parameter associated with the retriever, and communicate information associated with the battery parameter and the retriever usage parameter via the bidirectional RF transceiver. The battery parameter can comprise one or more of: a charge level of the battery, a duration of battery charging, a battery voltage, a battery current, or a state of whether the battery is being charged. The retriever usage parameter can comprise one or more of: a time that the retriever has been powered on, a driving time for the retriever, an idle time for the retriever, a number of times a hood of the retriever has been opened, a fault indicator, or an interrupt signal.

In a second aspect, the retriever of aspect 1, wherein the control circuit is configured to monitor a location parameter for the retriever, and wherein the location parameter includes one or more of: a location of the retriever, a path taken by the retriever, or a speed for the retriever.

In a third aspect, in the retriever of aspects 1 or 2, the control circuit is further configured to monitor one or more of: a number of shopping carts coupled to the retriever or identities of the shopping carts coupled to the retriever.

In a fourth aspect, the retriever of aspect 3, where the control circuit is further configured to monitor one or more of: a duration of a cart retrieval trip, a number of stops made during a cart retrieval trip, a path taken during a cart retrieval trip, a timestamp for a cart retrieval trip, or an average speed for a cart retrieval trip.

In a fifth aspect, the retriever of any of aspects 1-4 further comprising a manual throttle configured to communicate a drive signal to the control circuit. The control circuit is configured to monitor the driving time for the retriever when controlled by the manual throttle.

In a sixth aspect, the retriever of any of aspects 1-5 further comprising a remote control configured to communicate a control signal to the retriever.

In a seventh aspect, the retriever of the sixth aspect, wherein the remote control is battery-operated, and the control circuit is further configured to receive a battery monitoring signal indicating a charge level of a battery in the remote control.

In an eight aspect, the retriever of the fifth aspect or the sixth aspect, where the control circuit is configured to monitor the driving time for the retriever when controlled by the remote control.

In a ninth aspect, the retriever of any of aspects 6-8, wherein the control signal comprises a first speed signal to move the retriever at a first speed and also comprises a second speed signal to move the retriever at a second speed. The first speed is greater than the second speed. The control circuit is configured to monitor one or more of: a driving time for the retriever at the first speed, a driving time for the retriever at the second speed, or an average speed.

In a tenth aspect, the retriever of any of aspects 6-9, wherein the control circuit is configured to monitor an identity of the remote control that is associated with the retriever.

In an eleventh aspect, the retriever of any of aspects 6-10, wherein the remote control includes a display. The display is configured to output one or more of: the charge level of the battery in the retriever, a speed of the retriever, a number of shopping carts coupled to the retriever, or a trip time of the retriever.

In a twelfth aspect, the retriever in any of aspects 1-11, wherein the control circuit is configured to communicate the battery parameter or the retriever usage parameter to a remote computing system via the bidirectional RF transceiver.

In a thirteenth aspect, a system for monitoring usage of a cart fleet is disclosed. The cart fleet comprises a cart retriever and a plurality of human-propelled carts. The system comprises a plurality of human-propelled carts, each cart in the plurality of human-propelled carts comprising a first radio frequency (RF) communication circuit. The system also comprises a cart retriever configured to be coupled to a cart train comprising at least some of the plurality of human-propelled carts. The cart retriever comprises a second RF communication circuit configured to communicate with the first RF communication circuits in the carts in the cart train. The cart retriever comprises a control circuit that is configured to: communicate with the carts in the cart train to determine a number of carts coupled to the cart retriever and to monitor event data that occurs during a cart retrieval trip. The event data includes one or more of: a path taken by the cart retriever while coupled to the cart train during the cart retrieval trip, a duration of the cart retrieval trip, a number of stops made during the cart retrieval trip, a timestamp for the cart retrieval trip, or a speed of the cart retriever during the cart retrieval trip.

In a fourteenth aspect, the system of the thirteenth aspect, further comprising a battery-operated remote control configured to control the operation of the cart retriever at a two or more different speeds. The control circuit is configured to monitor one or more of: a charge level of a battery in the remote control, a driving time for the cart retriever when controlled by the remote control, a driving time for the cart retriever at a first speed of the two or more different speeds, a driving time for the cart retriever at a second speed of the two or more different speeds, or an identity of the remote control that is associated with the cart retriever.

In a fifteenth aspect, the system of any of aspects 13-14, wherein the cart retriever comprises an electric motor powered by a battery. The control circuit is further configured to monitor one or more of: a charge level of the battery, a duration of battery charging, a battery voltage, a battery current, or a state of whether the battery is being charged.

In a sixteenth aspect, the system of any of aspects 13-15, further comprising a processing system configured to communicate with the second RF communication circuit of the cart retriever. The processing system comprises computer hardware programmed to receive the event data from the cart retriever and to generate a report comprising summary information related to the event data.

In a seventeenth aspect, the system of any aspects 13-16, wherein each cart in the plurality of human-propelled carts is a shopping cart, and the cart retriever is a shopping cart retriever.

In an eighteenth aspect, a method for monitoring usage of a cart fleet under control of a cart fleet management system comprising computer hardware is disclosed. The cart fleet comprises a cart retriever and a plurality of human-propelled carts. The method comprises receiving cart fleet event data via two-way radio frequency (RF) communication with the cart retriever, the cart retriever being configured to collect a train of the human-propelled carts during each of a plurality of cart retrieval trips. The cart fleet event data comprises one or more of: paths taken by the cart retriever and the train during the cart retrieval trips, durations of the cart retrieval trips, numbers of stops made during the cart retrieval trips, timestamps for the cart retrieval trips, or speeds of the cart retriever during the cart retrieval trips. The method also comprises aggregating the cart fleet event data for the plurality of cart retrieval trips. The method also comprises analyzing the aggregated cart fleet event data to generate statistical information regarding the cart fleet.

In a nineteenth aspect, the method of aspect 18, wherein the statistical information comprises one or more of: a total number of carts retrieved, an average number of carts retrieved per cart retrieval trip, an average duration of the cart retrieval trips, an average path length of the cart retrieval trips, an average number of stops made during the cart retrieval trips, or an average speed of the cart retriever during cart retrieval trips.

In a twentieth aspect, the method of aspect 18 or 19, wherein the cart retriever comprises an electric motor powered by a battery. The cart fleet event data comprises one or more of: a charge level of the battery, a duration of battery charging, a battery voltage, a battery current, a state of whether the battery is being charged, a motor current, or a motor voltage. The statistical information comprises information relating to the battery charge status of the cart retriever, whether or when the battery is nearing an end of its service life, overloading of the cart retriever, or underutilization of the cart retriever.

In a twenty-first aspect, the method of any of aspects 18-20, the method further comprising determining, from the aggregated cart fleet event data, an efficient or optimal path for the cart retriever to follow or one or more optimal times for collecting carts.

In a twenty-second aspect, the method of any of aspects 18-21 further comprising determining, from the cart fleet event data or the aggregated cart fleet event data, whether a particular path taken by the cart retriever adhered to a preset cart collection path.

In a twenty-third aspect, the method of aspect 22 further comprising determining, from the cart fleet event data or the aggregated cart fleet event data, operator compliance with following the preset cart collection path.

In a twenty-fourth aspect, the method of any of aspects 18-23, wherein each cart in the plurality of human-propelled carts is a shopping cart, and the cart retriever is a shopping cart retriever.

Additional Information

The various illustrative logical blocks, modules, and processes described herein may be implemented or performed by a machine, such as a computer, a processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor may be a microprocessor, a controller, microcontroller, state machine, combinations of the same, or the like. A processor may also be implemented as a combination of computing devices, e.g., a combination of a DSP and a microprocessor, a plurality of microprocessors or processor cores, one or more graphics or stream processors, one or more microprocessors in conjunction with a DSP, or any other such configuration. Further, certain implementations of the cart fleet management systems of the present disclosure are sufficiently mathematically, computationally, or technically complex that application-specific hardware or one or more physical computing devices (utilizing appropriate executable instructions) may be necessary to perform the functionality, for example, due to the volume or complexity of the calculations involved (e.g., analyzing cart fleet event data for many carts and cart retrievers that have undertaken a large number of cart collection trips) or to provide results (e.g., statistical information) substantially in real-time.

The blocks or states of the processes described herein may be embodied directly in hardware, in a software module stored in a non-transitory memory and executed by a hardware processor, or in a combination of the two. For example, each of the processes described above may also be embodied in, and fully automated by, software modules (stored in a memory) executed by one or more machines such as computers or computer processors. A module may reside in a non-transitory computer readable medium such as RAM memory, flash memory, ROM memory, EPROM memory, EEPROM memory, registers, hard disk, a removable disk, a CD-ROM, memory capable of storing firmware, or any other form of computer-readable (e.g., storage) medium known in the art. A computer-readable medium can be coupled to a processor such that the processor can read information from, and write information to, the computer-readable medium. In the alternative, the computer-readable medium may be integral to the processor. The processor and the computer-readable medium may reside in an ASIC. The computer-readable medium may include non-transitory data storage (e.g., a hard disk, non-volatile memory, etc.).

Depending on the embodiment, certain acts, events, or functions of any of the processes or methods described herein can be performed in a different sequence, may be added, merged, or left out altogether. Thus, in certain embodiments, not all described acts or events are necessary for the practice of the processes. Moreover, in certain embodiments, acts or events may be performed concurrently, e.g., through multi-threaded processing, interrupt processing, or via multiple processors or processor cores, rather than sequentially. In any apparatus, system, or method, no element or act is necessary or indispensable to all embodiments, and the disclosed apparatus, systems, and methods can be arranged differently than shown or described.

Conditional language used herein, such as, among others, "can," "could," "might," "may," "e.g.," and from the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present. The term "a" or "an" or "the" when referring to an element means one or more of the element.

While the above detailed description has shown, described, and pointed out novel features as applied to various embodiments, it will be understood that various omissions, substitutions, and changes in the form and details of the logical blocks, modules, and processes illustrated may be made without departing from the spirit of the disclosure. As will be recognized, certain embodiments of the inventions described herein may be embodied within a form that does not provide all of the features and benefits set forth herein, as some features may be used or practiced separately from others.

What is claimed is:

1. A retriever for shopping carts, the retriever comprising:
   an electric motor;
   a battery electrically connected to the electric motor;
   a cart connection assembly configured to couple a shopping cart to the retriever;
   a bidirectional wireless radio frequency (RF) transceiver; and
   a control circuit in electrical communication with the electric motor and the RF transceiver, the control circuit configured to:
      communicate a drive command to the electric motor;
      monitor a duration of charging of the battery electrically connected to the electric motor;
      monitor a retriever usage parameter associated with the retriever;
      monitor one or more of: a number of shopping carts coupled to the retriever or identities of the shopping carts coupled to the retriever;
      monitor one or more of: a duration of a cart retrieval trip, a number of stops made during a cart retrieval trip, a path taken during a cart retrieval trip, or a timestamp for a cart retrieval trip; and
      communicate information associated with the battery parameter and the retriever usage parameter via the bidirectional RF transceiver;
   wherein the retriever usage parameter comprises one or more of: an amount of time that the retriever has been powered on, an amount of driving time for the retriever, an amount of idle time for the retriever, or a number of times a hood of the retriever has been opened.

2. The retriever of claim 1, wherein the control circuit is configured to monitor a location parameter for the retriever, wherein the location parameter includes one or more of: a location of the retriever, a path taken by the retriever, or a speed for the retriever.

3. The retriever of claim 1, further comprising a manual throttle configured to communicate a drive signal to the control circuit, and wherein the control circuit is configured to monitor the amount of driving time for the retriever when controlled by the manual throttle.

4. The retriever of claim 1, further comprising a remote control configured to communicate a control signal to the retriever.

5. The retriever of claim 4, wherein the remote control is battery-operated, and the control circuit is further configured to monitor a charge level of a battery in the remote control.

6. The retriever of claim 4, wherein the control circuit is configured to monitor the driving time for the retriever when controlled by the remote control.

7. The retriever of claim 6, wherein the control signal comprises:
   a first speed signal to move the retriever at a first speed; and
   a second speed signal to move the retriever at a second speed, the first speed being greater than the second speed; and
   wherein the control circuit is configured to monitor one or more of: a driving time for the retriever at the first speed, a driving time for the retriever at the second speed, or an average speed.

8. The retriever of claim 4, wherein the control circuit is configured to monitor an identity of the remote control that is associated with the retriever.

9. The retriever of claim 4, wherein the remote control includes a display, and the display is configured to output one or more of: the charge level of the battery in the retriever, a speed of the retriever, a number of shopping carts coupled to the retriever, or a trip time of the retriever.

10. The retriever of claim 1, wherein the control circuit is configured to communicate the battery parameter or the retriever usage parameter to a remote computing system via the bidirectional RF transceiver.

11. A system for monitoring usage of a cart fleet comprising a cart retriever and a plurality of human-propelled carts, the system comprising:
    a plurality of human-propelled carts, each cart in the plurality of human-propelled carts comprising a first radio frequency (RF) communication circuit;
    a cart retriever configured to be coupled to a cart train comprising at least some of the plurality of human-propelled carts, the cart retriever comprising a second RF communication circuit configured to communicate with the first RF communication circuits in the carts in the cart train, the cart retriever comprising a control circuit configured to:
       communicate with the carts in the cart train to determine a number of carts coupled to the cart retriever; and
       monitor event data that occurs during a cart retrieval trip;
       wherein the event data includes one or more of: a path taken by the cart retriever while coupled to the cart train during the cart retrieval trip, a duration of the cart retrieval trip, a number of stops made during the cart retrieval trip, or a timestamp for the cart retrieval trip; and
       wherein the cart retriever comprises an electric motor powered by a battery that is electrically coupled to the electric motor, and the control circuit is further configured to monitor a duration of charging of the battery electrically connected to the electric motor: and
    a processing system configured to communicate with the second RF communication circuit of the cart retriever, the processing system comprising computer hardware programmed to:
       receive the event data from the cart retriever; and
       generate a report comprising summary information related to the event data.

12. The system of claim 11, wherein the system further comprises a battery-operated remote control configured to control the operation of the cart retriever at a two or more different speeds, and the control circuit is configured to monitor one or more of: a charge level of a battery in the remote control, a driving time for the cart retriever when controlled by the remote control, a driving time for the cart retriever at a first speed of the two or more different speeds, a driving time for the cart retriever at a second speed of the two or more different speeds, or an identity of the remote control that is associated with the cart retriever.

13. The system of claim 11, wherein each cart in the plurality of human-propelled carts is a shopping cart, and the cart retriever is a shopping cart retriever.

14. A method for monitoring usage of a cart fleet comprising a cart retriever and a plurality of human-propelled carts, the method comprising:

under control of a cart fleet management system comprising computer hardware:

receiving cart fleet event data via two-way radio frequency (RF) communication with the cart retriever, the cart retriever configured to collect a train of the human-propelled carts during each of a plurality of cart retrieval trips, wherein the cart fleet event data comprises one or more of: paths taken by the cart retriever and the train during the cart retrieval trips, durations of the cart retrieval trips, numbers of stops made during the cart retrieval trips, or timestamps for the cart retrieval trips;

aggregating the cart fleet event data for the plurality of cart retrieval trips; and analyzing the aggregated cart fleet event data to generate statistical information regarding the cart fleet, wherein the statistical information comprises one or more of: a total number of carts retrieved, an average number of carts retrieved per cart retrieval trip, an average duration of the cart retrieval trips, an average path length of the cart retrieval trips, or an average number of stops made during the cart retrieval trips.

15. The method of claim 14, wherein the cart retriever comprises an electric motor powered by a battery, and wherein the cart fleet event data comprises a state of whether the battery is being charged, and the statistical information comprises information relating to whether or when the battery is nearing an end of its service life, or underutilization of the cart retriever.

16. The method of claim 14, wherein the method further comprises determining, from the aggregated cart fleet event data, an efficient or optimal path for the cart retriever to follow or one or more optimal times for collecting carts.

17. The method of claim 14, further comprising determining, from the cart fleet event data or the aggregated cart fleet event data, whether a particular path taken by the cart retriever adhered to a preset cart collection path.

18. The method of claim 17, further comprising determining, from the cart fleet event data or the aggregated cart fleet event data, operator compliance with following the preset cart collection path.

19. The retriever of claim 1, wherein the control circuit is further configured to monitor an average speed for a cart retrieval trip.

20. The system of claim 11, wherein the control circuit is further configured to monitor a speed of the cart retriever during the cart retrieval trip.

21. The method of claim 14, wherein the cart fleet event data further comprises speeds of the cart retriever during the cart retrieval trips, and the statistical information further comprises an average speed of the cart retriever during cart retrieval trips.

* * * * *